(12) United States Patent
Chen et al.

(10) Patent No.: US 11,124,298 B2
(45) Date of Patent: *Sep. 21, 2021

(54) FOLDABLE UAV

(71) Applicant: SZ DJI TECHNOLOGY CO., LTD., Shenzhen (CN)

(72) Inventors: Hanping Chen, Shenzhen (CN); Mingxi Wang, Shenzhen (CN); Xiangyu Chen, Shenzhen (CN); Qi Zhou, Shenzhen (CN); Yuwei Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,266

(22) Filed: Sep. 28, 2020

(65) Prior Publication Data

US 2021/0009269 A1   Jan. 14, 2021

Related U.S. Application Data

(63) Continuation of application No. 16/192,316, filed on Nov. 15, 2018, now Pat. No. 10,793,270, which is a (Continued)

(51) Int. Cl.
*B64C 39/02* (2006.01)
*B64C 3/56* (2006.01)

(52) U.S. Cl.
CPC .............. *B64C 39/024* (2013.01); *B64C 3/56* (2013.01); *B64C 2201/027* (2013.01); *B64C 2201/108* (2013.01)

(58) Field of Classification Search
CPC ........ B64C 2201/027; B64C 2201/108; B64C 2201/165; B64C 39/024; B64C 3/56; B64C 27/08

See application file for complete search history.

(56) References Cited

U.S. PATENT DOCUMENTS 8,292,215 B2 * 10/2012 Olm .................... B64C 39/024
   244/17.23
8,646,720 B2 * 2/2014 Shaw .................. B64C 29/0025
   244/17.23

(Continued)

FOREIGN PATENT DOCUMENTS

CN   204395444 U   6/2015
CN   204452927 U   7/2015

(Continued)

OTHER PUBLICATIONS

The World Intellectual Property Organization (WIPO) International Search Report and Written Opinion for PCT/CN2016/083766 dated Feb. 24, 2017 10 pages.

*Primary Examiner* — Medhat Badawi
(74) *Attorney, Agent, or Firm* — Anova Law Group, PLLC

(57) ABSTRACT

An unmanned aerial vehicle (UAV) includes a central body and a plurality of arms extendable from the central body using one or more actuators. Each of the plurality of arms is configured to support one or more propulsion units. One arm of the plurality of arms is configured to connect to one of the one or more actuators via a linkage mechanism. The one of the one or more actuators is configured to actuate the linkage mechanism between (1) a first dead center position for securing the one arm when the one arm is extended away from the central body in a flight configuration and (2) a second dead center position for securing the one arm when the one arm is folded substantially parallel to the central body in a compact configuration.

19 Claims, 18 Drawing Sheets

Related U.S. Application Data continuation of application No. PCT/CN2016/083766, filed on May 28, 2016.

(56) References Cited

U.S. PATENT DOCUMENTS

| | | | | |
|---|---|---|---|---|
| 8,695,919 | B2 * | 4/2014 | Shachor | B64C 39/022 |
| | | | | 244/17.17 |
| 8,774,982 | B2 * | 7/2014 | Oakley | B64C 27/08 |
| | | | | 701/2 |
| 8,794,566 | B2 * | 8/2014 | Hutson | F16M 13/02 |
| | | | | 244/17.23 |
| 8,931,730 | B2 * | 1/2015 | Wang | B64C 25/32 |
| | | | | 244/17.17 |
| 9,527,588 | B1 * | 12/2016 | Rollefstad | G05D 1/0005 |
| 9,573,683 | B2 * | 2/2017 | Martin | B64C 39/024 |
| 9,623,969 | B2 * | 4/2017 | Nelson | B64C 39/024 |
| 9,764,829 | B1 * | 9/2017 | Beckman | B64C 15/14 |
| D803,328 | S * | 11/2017 | Lee | D21/441 |
| 2006/0123594 | A1 * | 6/2006 | You | E04H 15/48 |
| | | | | 16/326 |
| 2013/0146716 | A1 * | 6/2013 | Gettinger | B64C 5/12 |
| | | | | 244/215 |
| 2016/0114887 | A1 * | 4/2016 | Zhou | H04N 5/265 |
| | | | | 348/148 |
| 2016/0122016 | A1 * | 5/2016 | Mintchev | B64C 39/024 |
| | | | | 244/17.23 |
| 2016/0340028 | A1 * | 11/2016 | Datta | B64C 15/12 |
| 2016/0355261 | A1 * | 12/2016 | Chin | B64C 39/024 |
| 2017/0291677 | A1 * | 10/2017 | Harris | B64C 39/024 |
| 2018/0118322 | A1 * | 5/2018 | Harris | B64C 39/024 |
| 2019/0086920 | A1 * | 3/2019 | Miller | G02B 27/0172 |
| 2021/0009269 | A1 * | 1/2021 | Chen | B64C 39/024 |

FOREIGN PATENT DOCUMENTS

| | | |
|---|---|---|
| CN | 204507252 U | 7/2015 |
| CN | 104828245 A | 8/2015 |
| CN | 204660023 U | 9/2015 |
| CN | 105059528 A | 11/2015 |
| CN | 105109666 A | 12/2015 |
| CN | 204895844 U | 12/2015 |
| CN | 204937498 U | 1/2016 |
| CN | 205010485 U | 2/2016 |
| CN | 205186507 U | 4/2016 |
| CN | 105539811 A | 5/2016 |
| CN | 205707290 U | 11/2016 |
| CN | 205707291 U | 11/2016 |
| DE | 102009001759 A1 | 10/2010 |
| KR | 1020150145853 A | 12/2015 |

\* cited by examiner

Part A

Part B

Part A

Part B

Part C

1110   Part A

Part B

Part C

Part D

Part E

FOLDABLE UAV

CROSS-REFERENCE TO RELATED APPLICATIONS

This application is a continuation of application Ser. No. 16/192,316, filed on Nov. 15, 2018, which is a continuation of International Application No. PCT/CN2016/083766, filed on May 28, 2016, the entire contents of both of which are incorporated herein by reference.

BACKGROUND OF THE DISCLOSURE

Unmanned vehicles, such as unmanned ground vehicles, aerial vehicles, surface vehicles, underwater vehicles, and spacecraft, have been developed for a wide range of applications including surveillance, search, rescue operations, exploration, and other fields. In some instances, the unmanned vehicles may be outfitted with a payload configured to collect data during operation. A payload may be coupled to an unmanned vehicle via a carrier that provides movement of the payload in one or more degrees of freedom. For example, an unmanned aerial vehicle (UAV) may be equipped with a payload comprising an imaging device (e.g., a camera) for aerial photography. A gimbal may serve as a carrier for coupling the imaging device to the UAV. The design of UAVs involves tradeoffs among numerous factors, including but not limited to a vehicle size, weight, portability, payload capacity, energy consumption, and cost.

SUMMARY OF THE DISCLOSURE

A need exists for unmanned aerial vehicles (UAVs) having improved mobility, portability, and form factor. According to an aspect of the disclosure, a UAV may include a plurality of foldable arms. Each foldable arm may be configured to transform between a flight configuration and a compact configuration. In some instances, each arm may comprise a plurality of foldable sections that extend away from the central body when the arm is in the flight configuration. The plurality of foldable sections in each arm may be folded toward a corresponding side of the central body when the arm is in the compact configuration. The UAV may be provided having a flight configuration or a compact configuration depending on the state/configuration of the arms. For example, when the arms are folded into a compact configuration, the UAV may also be in a compact configuration in which the UAV is not in flight (or not capable of flight). Conversely, when the arms extend away from the body and transform from the compact configuration to a flight configuration, the UAV may likewise transform into a flight configuration in which the UAV is capable of flight. In some cases, power may be provided to the UAV when it is transformed into the flight configuration, such that the UAV is in an operational state. In some instances, the arms may be provided having various states of folding between the compact configuration and the flight configuration.

According to an aspect of the disclosure, an unmanned aerial vehicle (UAV) comprises a central body having a plurality of sides. The UAV also comprises a plurality of arms extendable from the central body, wherein each arm of the plurality of arms comprises a plurality of foldable sections. Each of the plurality of arms is configured to transform between (1) a flight configuration wherein the plurality of foldable sections in each arm are extended away from the central body and (2) a compact configuration wherein the plurality of foldable sections in each arm are folded toward a corresponding side of the central body such that the plurality of foldable sections are substantially parallel to one another.

Further aspects of the disclosure may be directed to a method for assembling an unmanned aerial vehicle (UAV). The method comprises providing a central body of the UAV. The method also comprises attaching a plurality of arms to the central body, wherein each of the plurality of arms is extendable from the central body and comprises a plurality of foldable sections, thereby assembling the UAV. Each of the plurality of arms is configured to transform between (1) a flight configuration wherein the plurality of foldable sections in each arm are extended away from the central body and (2) a compact configuration wherein the plurality of foldable sections in each arm are folded toward a corresponding side of the central body such that the plurality of foldable sections are substantially parallel to one another.

A kit may be provided in accordance with an additional aspect of the disclosure. The kit comprises a plurality of arms configured to be attached to a central body of an unmanned aerial vehicle (UAV), each of the plurality of arms comprising a plurality of foldable sections, wherein the plurality of arms are configured to be extendable from the central body. The kit also comprises instructions for assembling the UAV, such that when the UAV is assembled according to the instructions, the assembled UAV is characterized in that: each of the plurality of arms, when attached to the central body, is configured to transform between (1) a flight configuration wherein the plurality of foldable sections in each arm are extended away from the central body, and (2) a compact configuration wherein the plurality of foldable sections in each arm are folded toward a corresponding side of the central body such that the plurality of foldable sections are substantially parallel to one another.

According to another aspect of the disclosure, an unmanned aerial vehicle (UAV) comprises a central body. The UAV also comprises a plurality of arms extendable from the central body, wherein each arm of the plurality of arms is configured to support one or more propulsion units and comprises a plurality of foldable sections configured to rotate relative to one another using a chain mechanism. The chain mechanism is configured to transform each arm between (1) a flight configuration wherein the plurality of foldable sections are extended away from one another, and (2) a compact configuration wherein the plurality of foldable sections are folded substantially parallel to one another.

Further aspects of the disclosure may be directed to a method for assembling an unmanned aerial vehicle (UAV). The method comprises providing a central body of the UAV. The method also comprises attaching a plurality of arms to the central body, wherein each of the plurality of arms is configured to support one or more propulsion units and comprises a plurality of foldable sections configured to rotate relative to one another using a chain mechanism. The chain mechanism is configured to transform each arm between (1) a flight configuration wherein the plurality of foldable sections are extended away from one another, and (2) a compact configuration wherein the plurality of foldable sections are folded substantially parallel to one another.

A kit may be provided according to another aspect of the disclosure. The kit comprises a plurality of arms configured to be attached to a central body of an unmanned aerial vehicle (UAV), wherein each arm of the plurality of arms comprises a plurality of foldable sections configured to rotate relative to one another using a chain mechanism. The kit also comprises instructions for assembling the UAV, such that when the UAV is assembled according to the instructions, the assembled UAV is characterized in that: the chain mechanism is configured to transfer each arm between (1) a flight configuration wherein the plurality of foldable sections are extended away from one another, and (2) a compact configuration wherein the plurality of foldable sections are folded substantially parallel to one another.

According to an aspect of the disclosure, an unmanned aerial vehicle (UAV) comprises a central body. The UAV also comprises a plurality of arms extendable from the central body using one or more actuators, wherein each of the plurality of arms is configured to support one or more propulsion units. Each of the plurality of arms is configured to connect to each actuator via a linkage mechanism, wherein each actuator is configured to actuate the linkage mechanism between (1) a first dead center position for securing the arm when the arm is extended away from the central body in a flight configuration and (2) a second dead center position for securing the arm when the arm is folded substantially parallel to the central body in a compact configuration.

Further aspects of the disclosure may be directed to a method for assembling an unmanned aerial vehicle (UAV). The method comprises providing a central body of the UAV. The method also comprises attaching a plurality of arms to the central body, wherein the plurality of arms are extendable from the central body using one or more actuators and each of the plurality of arms is configured to support one or more propulsion units. Each of the plurality of arms is configured to connect to each actuator via a linkage mechanism, wherein each actuator is configured to actuate the linkage mechanism between (1) a first dead center position for securing the arm when the arm is extended away from the central body in a flight configuration and (2) a second dead center position for securing the arm when the arm is folded substantially parallel to the central body in a compact configuration.

A kit may be provided according to another aspect of the disclosure. The kit comprises a plurality of arms configured to be attached to a central body of an unmanned aerial vehicle (UAV), wherein the plurality of arms are extendable from the central body using one or more actuators and each of the plurality of arms is configured to support one or more propulsion units. The kit also comprises instructions for assembling the UAV, such that when the UAV is assembled according to the instructions, the assembled UAV is characterized in that: wherein each of the plurality of arms is configured to connect to each actuator via a linkage mechanism, wherein each actuator is configured to actuate the linkage mechanism between (1) a first dead center position for securing the arm when the arm is extended away from the central body in a flight configuration and (2) a second dead center position for securing the arm when the arm is folded substantially parallel to the central body in a compact configuration.

According to an aspect of the disclosure, an unmanned aerial vehicle (UAV) comprises a central body. The UAV also comprises a plurality of arms extendable from the central body. Each arm of the plurality of arms is configured to support one or more propulsion units carrying one or more rotor blades. Each arm comprises a plurality of foldable sections and a guiding member disposed on at least one of the foldable sections. The guiding member is configured to guide rotation of the one or more rotor blades as the arm transforms from (1) a flight configuration wherein the plurality of foldable sections are extended away from the central body to (2) a compact configuration wherein the plurality of foldable sections are folded substantially parallel to one another, such that the one or more rotor blades are substantially parallel to the plurality of foldable sections when the arm is in the compact configuration.

Further aspects of the disclosure may be directed to a method for assembling an unmanned aerial vehicle (UAV). The method comprises providing a central body of the UAV. The method also comprises attaching to the central body a plurality of arms, wherein each arm of the plurality of arms is configured to support one or more propulsion units carrying one or more rotor blades and comprises a plurality of foldable sections. The method further comprises disposing a guiding member on at least one of the foldable sections, thereby assembling the UAV. The guiding member is configured to guide rotation of the one or more rotor blades as the arm transforms from (1) a flight configuration wherein the plurality of foldable sections are extended from the central body to (2) a compact configuration wherein the plurality of foldable sections are folded substantially parallel to one another, such that the one or more rotor blades are substantially parallel to the plurality of foldable sections when the arm is in the compact configuration.

A kit may be provided according to another aspect of the disclosure. The kit comprises a plurality of arms configured to be attached to a central body of an unmanned aerial vehicle (UAV). Each arm of the plurality of arms is configured to support one or more propulsion units carrying one or more rotor blades. Each arm comprises a plurality of foldable sections and a guiding member disposed on at least one of the foldable sections. The kit also comprises instructions for assembling the UAV, such that when the UAV is assembled according to the instructions, the assembled UAV is characterized in that: the guiding member is configured to guide rotation of the one or more rotor blades as the arm transforms from (1) a flight configuration wherein the plurality of foldable sections are extended from the central body to (2) a compact configuration wherein the plurality of foldable sections are folded substantially parallel to one another, such that the one or more rotor blades are substantially parallel to the plurality of foldable sections when the arm is in the compact configuration.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the disclosure will be obtained by reference to the following detailed description that sets forth illustrative embodiments, in which the principles of the disclosure are utilized, and the accompanying drawings of which:

DETAILED DESCRIPTION OF THE EMBODIMENTS

Figure 1:
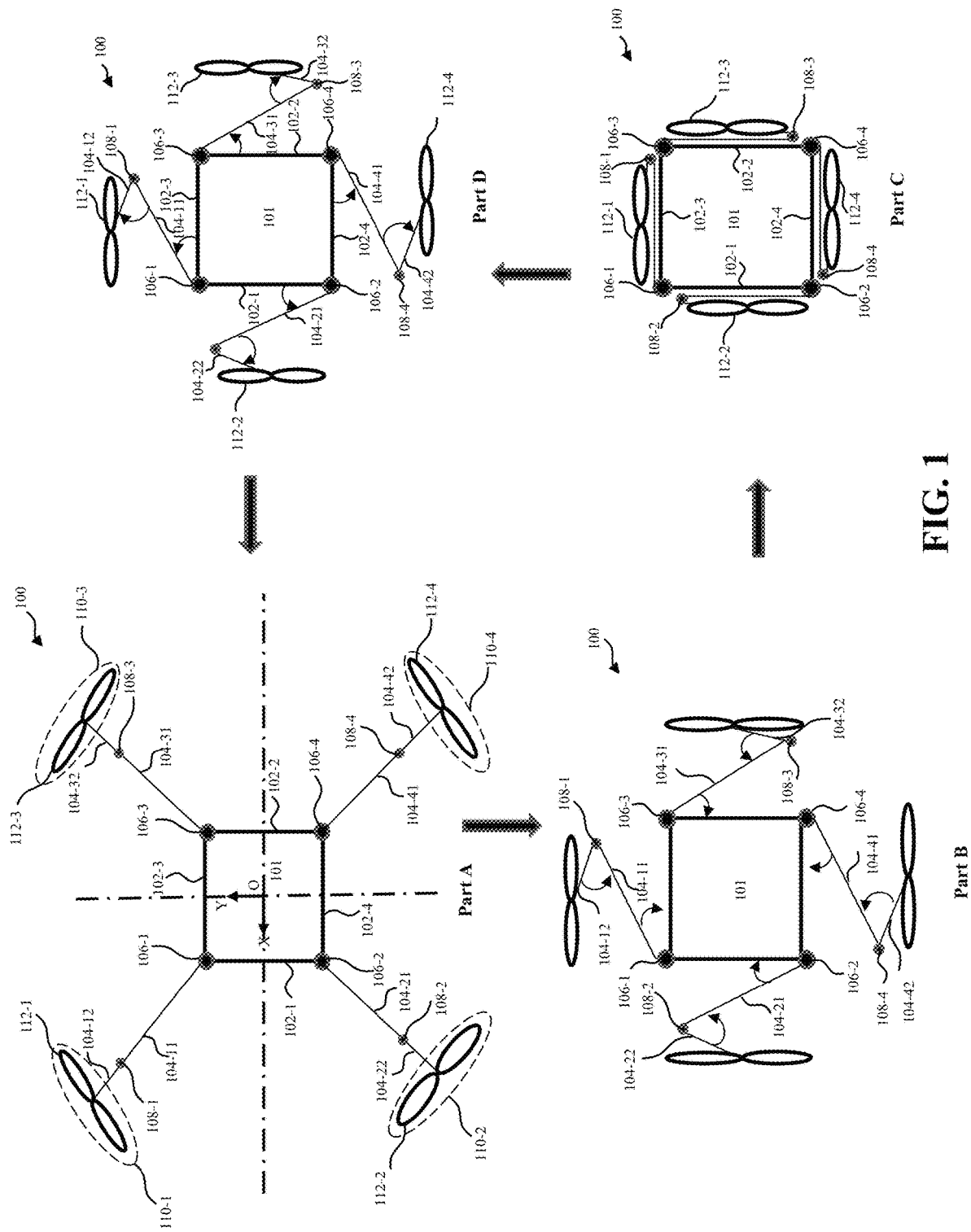
FIG. 1 illustrates schematic views of an unmanned aerial vehicle (UAV) showing its arms transforming between a flight configuration and a compact configuration, in accordance with embodiments of the disclosure.

Systems, apparatus, and methods for improving portability, transportation, form factor and storage of an aerial vehicle, e.g., an unmanned aerial vehicle (UAV), are provided herein. In some embodiments, the aerial vehicle may include a plurality of arms, each of which may have a plurality of foldable sections. Each arm may be configured to transform between a flight configuration and a compact configuration by folding or unfolding the foldable sections within each arm. For example, a plurality of foldable sections of an arm may be folded toward a central body of a UAV such that the arm is in the compact configuration. When the arms are in the compact configuration, the UAV may not be in flight or may be in a non-operational state (e.g., the UAV may be powered off). Conversely, a plurality of foldable sections of an arm may be extended away from the central body such that the arm is in the flight configuration. When the arms are in the flight configuration, the UAV may be capable of flight or may be in an operational state (e.g., the UAV may be powered on). The compact configuration can improve the portability, transportation, form factor, and storage of the UAV. For example, a space around the central body of the UAV may be used to store or receive one or more foldable sections, such as arms or propulsion units, when they are not in use.

An aerial vehicle according to embodiments of the disclosure can be provided having a flight configuration or a compact configuration, depending on the state/configuration of the arms. For example, an aerial vehicle can have (1) a flight configuration in which the aerial vehicle is in use or in operation with its arms being unfolded, and (2) a compact configuration in which the aerial vehicle is not in use or non-operational with its arms being folded. The compact configuration may facilitate transportation, carrying, or storage of the aerial vehicle. In some cases, the compact configuration may reduce a size or volume of the aerial vehicle so that the aerial vehicle can be transported in a passenger vehicle, put into a pocket of the user, hooked onto a backpack, or simply carried by a user in his hands, thereby improving mobility of the aerial vehicle. When the aerial vehicle is in the compact configuration, the aerial vehicle may occupy less space. In some instances, this can optimize large-scale parking, stacking, and storage of aerial vehicles.

Additionally, the systems, apparatus, and methods described herein can facilitate smooth transformation of an aerial vehicle between its compact configuration and flight configuration, without requiring manual intervention from a user. For example, multiple foldable sections of an arm of an aerial vehicle can be extended or retracted automatically or semi-automatically using an actuator mechanism. The actuator mechanism may include one or more motors capable of actuating one or more sections of the arms, in one or more degrees of freedom.

Various embodiments of the disclosure may be directed to an aerial vehicle, such as an unmanned aerial vehicle (UAV). In one aspect of the disclosure, a UAV may comprise a central body having a plurality of arms. Each of the plurality of arms may be extendable from the central body and comprise a plurality of foldable sections. Each of the plurality of arms may be configured to transform between (1) a flight configuration wherein the plurality of foldable sections in each arm are extended away from the central body and (2) a compact configuration wherein the plurality of foldable sections in each arm are folded toward a corresponding side of the central body such that the plurality of foldable sections are substantially parallel to one another.

In some embodiments, each of the plurality of arms is folded toward the corresponding side of the central body in a same direction. For example, the same direction may be a clockwise direction relative to the central body or a counter-clockwise direction relative to the central body. In some instances, the plurality of foldable sections in each arm are collinear to one another in the flight configuration. Further, the plurality of foldable sections in each arm may be configured to be at a same height relative to the central body in the compact configuration.

In some embodiments, each arm may comprise a proximal end and a distal end, and the plurality of foldable sections may be movably connected to one another between the proximal end and the distal end. In some instances, each of the plurality of arms is configured to be rotatably connected to the central body. For example, each arm may be configured to be pivotally coupled to the central body via a shaft which is parallel to a yaw axis of the UAV. In some implementations, the shaft may be provided by an actuator mechanism which may connect the arm to the central body of the UAV.

In some embodiments, each of the plurality of arms is configured to be extendable from the central body by an actuator mechanism, which may be configured to include one or more actuators, in particular, one or more motors. In some instances, each of the plurality of arms is configured to connect to each actuator via a linkage mechanism. Thereby, each actuator is configured to actuate the linkage mechanism for securing the arm between (1) a first dead center position in the flight configuration and (2) a second dead center position in the compact configuration.

In some embodiments, each of the plurality of arms is configured to support one or more propulsion units carrying one or more rotor blades, and a guiding member may be disposed on at least one of the plurality of foldable sections for guiding rotation of the one or more rotor blades as the arm transfers from the flight configuration to the compact configuration. In some instances, the one or more rotor blades may be configured to be substantially parallel to the plurality of foldable sections in the compact configuration, thereby further reducing space or volume of the UAV in the compact configuration.

The following will describe in detail the embodiments of the disclosure with reference to the accompanying drawings.

FIG. 1 illustrates schematic views of an unmanned aerial vehicle (UAV) as its arms transform between a flight configuration and a compact configuration, in accordance with embodiments of the disclosure. Any description herein of a UAV may apply to any type of movable object and vice versa. The movable object may be a motorized vehicle or vessel having one or more movable arms, wings, extended sections, and/or propulsion units.

As illustrated in FIG. 1, a UAV 100 may comprise a central body 101 having a plurality of sides 102. The UAV may further comprise a plurality of arms 104 extendable from the central body. The central body may correspond to an airframe, a housing or a fuselage of the UAV. The central body may have any shape and size to accommodate various design requirements, environments, fields, or the like. For example, a central body may be in a hexagonal, octagonal, or decagonal shape to meet different or specific design requirements. In some embodiments, the central body may be in a regular shape or an irregular shape. For example, a shape of the central body may be rectangular, prismatic, spherical, ellipsoidal, or the like. In some embodiments, a hollow cavity, a compartment or the like may be arranged at each side of the central body such that each arm is (1) received in the hollow cavity in the compact configuration and (2) extended out of the hollow cavity in the flight configuration.

The central body as illustrated in FIG. 1 may enclose one or more electrical components therein. For instance, a flight control unit, one or more navigation units (e.g., a globe positioning system unit), communication units (e.g., wired or wireless communication units), a variety of sensors, and/or power units (e.g., a rechargeable battery) may be provided within the central body.

A center of mass of the central body or the UAV may be denoted by a point O as illustrated. A roll axis (along the X-axis), a pitch axis (along the Y-axis), and a yaw axis (along the Z-axis, not shown) of the UAV may be defined relative to the point O. The UAV may be configured to rotate relative to one or more of the roll, pitch, and yaw axes during flight.

In the example of FIG. 1, the central body may have a first side 102-1, a second side 102-2 opposite to the first side, a third side 102-3, and a fourth side 102-4 opposite to the third side.

The plurality of arms 104 may be configured to be extendable from the central body of the UAV. In some embodiments, each arm may be extendable from a corresponding side of the central body and may be foldable toward the corresponding side of the central body. Each arm may comprise a proximal end, a distal end and a plurality of foldable sections that are movably connected to one another between the proximal end and the distal end. The proximal end of the arm may be rotatably connected to the central body via a first connecting mechanism, such as 106-1, 106-2, 106-3, and 106-4 as illustrated. The distal end of the arm may be connected to or configured to support one or more propulsion units, such as 110-1, 110-2, 110-3 and 110-4 as illustrated. Each of the propulsion units may comprise one or more rotor blades, such as 112-1, 112-2, 112-3, and 112-4 as illustrated. As depicted, each arm may comprise a plurality of foldable sections, such as 104-11, 104-12, 104-21, 104-22, 104-31, 104-32, 104-41 and 104-42 as illustrated, wherein two foldable sections may form or constitute one arm. A foldable section including a proximal end of an arm may be referred to as a proximal portion of the arm. Likewise, a foldable section including a distal end of the arm may be referred to as a distal portion of the arm. For example, in the arm shown in the top left of Part A of FIG. 1, the foldable section 104-11 is a proximal portion and the foldable section 104-12 is a distal portion. Similarly, in some embodiments, a foldable section including a proximal end of an arm may be referred to as a first foldable section, and a foldable section including a distal end of the arm may be referred to as an Nth foldable section if the arm comprises N foldable sections. For example, the foldable section 104-11 is a first foldable section and the foldable section 104-12 is a second foldable section when the arm, as illustrated comprises a total of two foldable sections.

An arm may be any frame member, connecting member, mounting arm, connecting arm, torsion arm, elongated arm, support frame, etc. that can be segmented into multiple sections and used to connect the propulsion unit to the central body. An arm may have any shape, and need not be limited to a linear shape. For example, an arm may be formed having a regular shape (e.g., cylindrical, rectangular block, circular or rectangular plate, etc.) or any irregular shape. In some implementations, the arms of the UAV as described herein may be implemented as tubes or rods extended laterally from the central body. For instance, the arms of the UAV may be hollow tubes (such as hollow tube 1117 in FIG. 11), or solid tubes, which may be formed from a metallic, plastic, or composite material. Alternatively, the arms of the UAV may be made from a lightweight material. For instance, the arms of the UAV may be formed from carbon fiber. Any dimension (e.g., length, width, thickness, diameter, circumference, or area) of the arm may be contemplated.

Although illustrated herein as having four arms, the UAV may have any number of arms for different purposes. For example, the number of arms may be selected or determined based on one or more factors, for example, a shape, a size or a weight of a central body of the UAV, a flight environment, a weight or a size of a payload with a carrier supporting the payload, tasks to be conducted by the UAV, or any combination thereof. For instance, there may be four arms for the central body with a square shape as schematically illustrated in FIG. 1, six arms for the central body with a hexagonal shape, and eight arms for the central body with an octagonal shape, and so forth. Further, having taken into account of the weight of the payload, an operator or a user may select a UAV with more arms for a heavy payload, or select a UAV with fewer arms for a relatively lighter payload.

In some implementations, a number of arms may be spaced apart evenly on a perimeter or periphery of a central body. In those cases, the arms may be extended from the central body of the UAV such that angles formed between each arm and the central body are the same for each arm in the flight configuration. In particular, the angle formed between the arm and central body may be (90+180/N) degrees when the arm is in the flight configuration, wherein N denotes the number of the arms. For instance, if four arms are deployed as depicted, then an angle between the arm and the central body may be (90+180/4), i.e., 135 degrees. Similarly, if six arms are deployed, then an angle between the arm and central body may be (90+180/6), i.e., 120 degrees. Likewise, if eight arms are deployed, an angle between the arm and central body may be (90+180/8), i.e., 112.5 degrees. Any type of structure (two-dimensional or three-dimensional) of the arm may be contemplated.

The arms of a UAV may have a circular cross section. Alternatively, the arms of the UAV may have a square or rectangular cross section. In addition, the arms of the UAV may have an elliptical cross section. Any appropriate cross section of the arm may be contemplated.

In some embodiments, each of the plurality of arms may be configured to be rotatably connected to the central body. In some implementations, each arm is configured to be pivotally coupled to the central body via a shaft. The shaft may be parallel to a yaw axis of the UAV. In some implementations, each of the plurality of arms is configured to be extendable from the central body using one or more actuators in an actuator mechanism. In this case, each arm may be connected to each actuator via a linkage mechanism. In some embodiments, each actuator may be configured to actuate the linkage mechanism for securing the arm between (1) a first dead center position in the flight configuration and (2) a second dead center position in the compact configuration. The first dead center position may be formed when at least two connecting bars in the linkage mechanism are disposed at a first angle relative to one another when the arm is in the flight configuration. The second dead center position may be formed when at least two connecting bars in the linkage mechanism are disposed at a second angle relative to one another when the arm is in the compact configuration.

In some embodiments, each arm may be configured to support one or more propulsion units carrying one or more rotor blades. A guiding member, such as guiding member 1110 in FIG. 11, may be disposed on at least one of the plurality of foldable sections for guiding rotation of the one or more rotor blades as the arm transforms from the flight configuration to the compact configuration. One or more rotor blades may be parallel to the corresponding side of the central body to minimize the space occupied by the UAV when it is in the compact configuration.

The plurality of foldable sections in each arm may be movably connected with one another via a variety of connecting mechanisms. In some embodiments, two neighboring foldable sections may be rotatably connected to one another. For example, in some implementations, the two neighboring foldable sections may be rotatably connected to one another via at least one hinge. In some implementations, two neighboring foldable sections may be slidably connected to one another. For example, one of the two neighboring foldable sections may be configured to be partially or entirely telescoped into another one of the two neighboring foldable sections. In some embodiments, the plurality of foldable sections may be configured to rotate relative to one another using a second connecting mechanism, such as those shown at 108-1, 108-2, 108-3, and 108-4.

In some embodiments, the second connecting mechanism may include a chain mechanism which is described in further detail with reference to FIG. 8. In some instances, the chain mechanism may be configured to transform each arm between (1) a flight configuration wherein the plurality of foldable sections are extended away from one another, and (2) a compact configuration wherein the plurality of foldable sections are folded substantially parallel to one another. In some implementations, the chain mechanism may comprise a plurality of sequentially-connected chain units. In some other implementations, the chain mechanism may comprise a drag chain or a multi-linkage mechanism. In some implementations, the chain mechanism may comprise at least one selected from a group consisting of a cable, a chain, a belt, or a spring.

A length of the arm (for example, lengths of multiple foldable sections) and the rotor blades may be configured based on the shape and length of a corresponding side of the central body of the UAV. For example, a length of a foldable section may be determined such that a UAV has a reduced volume or space when the UAV is in its compact configuration (e.g., shown in Part C of FIG. 1) compared to its flight configuration (e.g., shown in Part A of FIG. 1). In some embodiments, a length of the foldable section including a proximal end may be greater than a length of a foldable section including a distal end. For example, the length of the (first) foldable section 104-11 may be greater than the length of the (second) foldable section 104-12. In some implementations, a length of a foldable section including a proximal end of an arm may be about twice a length of a foldable section including a distal end of the arm.

In some embodiments, a length of a foldable section including a proximal end of an arm may be substantially equal to or less than a length of a corresponding side of the central body. For example, the length of the first foldable section 104-11 can be equal to or less than the length of the corresponding side 102-3 of the central body. In some embodiments, to further reduce the space occupied by the UAV in its compact configuration, a length of a foldable section including a proximal end of an arm may be configured to be substantially equal to a spread length of a propeller. The spread length may be a length of two rotor blades oppositely spread and supported at the distal end of an arm, as illustrated in FIG. 1. In some implementation, a length of a foldable section including a distal end of an arm may be equal to a length of a rotor blade.

In some embodiments, at least one foldable section of an arm may comprise a hollow cavity along its longitudinal axis, such that another foldable section of the arm movably connected to the at least one foldable section may be (1) received in the hollow cavity when the arm is in the compact configuration and (2) extended out of the hollow cavity when the arm is in the flight configuration.

The foldable sections of the arm each may be made of a lightweight material to reduce the weight of the UAV. For example, the foldable sections of the arm may be made of a carbon fiber composite material, such as carbon fiber reinforced plastic. The reduced weight can enable a longer flight time of the UAV.

The propulsion units as described herein may permit a UAV to move about in the air, for example, ascending, descending or accelerating. In some embodiments, one or more propulsion units may be connected to a distal end of the arm, and may enable the UAV to move about one or more, two or more, three or more, four or more, five or more, six or more degrees of freedom. In some instances, the UAV may be capable of rotating about one, two, three or more axes of rotation. The axes of rotation may be orthogonal to one another and may remain orthogonal to one another throughout the course of the UAV's flight. The axes of rotation may include a pitch axis, a roll axis, and/or a yaw axis.

The propulsion units may permit the UAV to move along one or more dimensions. For example, the UAV may be able to move upwards due to the lift generated by one or more rotors of the propulsion units. In some instances, based on the thrust or lift provided by the propulsion units, the UAV may be capable of moving along a Z axis (which may be up relative to the UAV orientation), an X axis, and/or a Y axis (which may be lateral). The UAV may be capable of moving along one, two, or three axes that may be orthogonal to one another. For example, the UAV may move along one or more of a yaw, a roll, or a pitch axis.

The propulsion units may include a plurality of rotors when the UAV is a multi-rotor craft. The plurality of rotors may be capable of rotating to generate lift for the UAV. The rotors may permit the UAV to take off and/or land vertically or to move about freely through the air. In some embodiments, the rotors may rotate at the same rate and/or may generate the same amount of lift or thrust for the UAV. In some embodiments, the rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The output to the propulsion units may be maintained and/or adjusted such that a vertical position and/or velocity of the UAV may be controlled accordingly. For example, increasing the speed of rotation of one or more rotors of the UAV may aid in causing the UAV to increase in altitude or increase in altitude at a faster rate, or increase the thrust of the rotors. In contrast, decreasing the speed of rotation of one or more rotors of the UAV may aid in causing the UAV to decrease in altitude, decrease in altitude at a faster rate, or decrease the thrust of the one or more rotors. When a UAV is taking off, the output provided to the propulsion units may be increased from its previous landed state. When the UAV is landing, the output provided to the propulsion units may be decreased from its previous flight state. The UAV may be configured to take off and/or land in a substantially vertical manner.

The altitude of the UAV and the speed of rotation of one or more rotors of the UAV may affect the lateral movement of the UAV. For example, the UAV may be tilted in a particular direction to move in that direction and the speed of the rotors of the UAV may affect the speed of the lateral movement and/or trajectory of movement. Lateral position and/or velocity of the UAV may be controlled by varying or maintaining the speed of rotation of one or more rotors of the UAV.

A set of rotor blades are mounted to and supported by the one or more rotors of the propulsion units via one or more rotor head assemblies. The rotor head assemblies may be secured to a corresponding rotor shaft by an appropriate attachment mechanism, such as linkages. In some instances, the rotor blades may be fixedly connected to the rotor head assemblies. In some other instances, the rotor blades may be detachably connected to the rotor head assemblies. For example, the rotor blades may be mounted to the rotors by a threaded connection, a locking connection or a clamping connection. The rotor blades may be foldable or retractable in any suitable manners so as to maintain a stowed position prior to the deployment. In addition, the rotor blades may be made of an appropriate lightweight and durable material such as carbon fiber. In some embodiments, the rotor blades may be propeller blades.

As shown in Part A of FIG. 1, the UAV and its arms are in the flight configuration. The proximal end of each arm 104 may be movably coupled to the central body 101 via the connecting mechanism 106 and the distal end of each arm may be coupled to the propulsion unit 110. Each arm may include a plurality of foldable sections, such as a first foldable section (or a proximal section) and a second foldable section (or a distal section), which may be movably connected with one another via the second connecting mechanism 108. Alternatively, the first foldable section and the second foldable section may be coupled to one other via any suitable coupling mechanism, such as fasteners, actuation elements, joints, hinges, bolts, screws, etc. In some embodiments, the second connecting mechanism may include a chain mechanism comprising one or more elastic elements, such as a drag chain. Each elastic element may be configured to cause the second foldable section to automatically (1) retract or fold toward the first foldable section when the arm is reversibly folded toward the corresponding side of the central body, as shown in Part B of FIG. 1 and (2) unfold or extend away from the corresponding side of the central body, as shown in Part D of FIG. 1.

In Part A of FIG. 1, the plurality of foldable sections in each arm are extended away from the central body when the arm is in the flight configuration. As previously described, the unfolding or extending of the arm away from the central body may be effected by the actuation mechanism in conjunction with the chain mechanism. For example, in some implementations, the first foldable section of the arm may be driven to extend from the corresponding side of the central body during actuation (unfolding) of the arm. Further, the actuation mechanism may also cause the chain mechanism to extend the second foldable section away from the first foldable section, as schematically illustrated in Part D of FIG. 1. In some instances, when a first changing angle formed between the first foldable section and the second foldable section reaches a first expected degree and a second changing angle formed between the first foldable section and the second foldable section reaches a second expected degree, the unfolding operation may stop and at this moment, each arm and thus the UAV may be in the flight configuration. The first and second expected degrees may be selected or determined based in part on the shape and/or number of arms of the UAV. For example, in some embodiments, the first expected degree may be 135 degrees for a UAV with a square central body and four arms. Alternatively, the first expected degree may be 120 degrees for a UAV with a hexagonal shape and six arms. In some embodiments, the second expected degree may be 180 degrees such that the first and second foldable sections may be collinear to one another.

When the UAV is in the flight configuration, the UAV may be ready for use or may be in operation. For example, a user may instruct the UAV, either directly or indirectly via a remote controller, to take off and conduct a wide range of tasks, including but not limited to data collection, aerial photography, surveillance, search and rescue operations, exploration, etc. For aerial photography, one or more imaging capture devices, such as a camera, may be mounted, either directly or indirectly via a carrier, to the UAV. The carrier herein may include a gimbal, which may support and permit the camera to rotate in different directions or about one or more different axes, such as a row axis, a yaw axis and a pitch axis.

Part B of FIG. 1 schematically illustrates an intermediate or transitional configuration from the flight configuration to the compact configuration. As shown in Part B, each arm of the UAV is being folded towards a corresponding side of the UAV. This may occur in an automatic or semi-automatic manner. For example, based on an initial setting, the UAV may automatically fold the arm once a flying task has been completed and operation of the UAV can cease. In some instances, when a power level of a battery on board the UAV is depleted below a threshold level, the UAV may automatically fold its arms and prepare for landing. In some instances, a user operating the UAV via a remote controller may input a command to the remote controller, to instruct the UAV to fold its arms while landing. In some embodiments, the user may instruct, via a user interface displayed on a touchscreen of the remote controller, the UAV to fold its arms while landing.

In some embodiments, the transitional configuration may occur when the UAV is descending below a predetermined altitude. In this case, the propulsion units of the UAV may remain operative and the propellers may still rotate to lift the UAV but at a relatively lower speed. As the UAV keeps descending and finally lands on the ground or at any given location, the UAV may enter into the compact configuration, as shown in Part C of FIG. 1. In some embodiments, this transitional configuration may occur as soon as, or after the UAV fully lands on the ground. In other words, folding the UAV into the compact configuration may also commence after the UAV lands on the ground or at any given location. In this case, the folding operations may proceed without rotation of the propulsion units.

The rotation of the first foldable section and the second foldable section may be in a same direction or in different directions. As shown in Part B of FIG. 1, the direction of rotation of the first foldable section is clockwise relative to the central body, and the direction of rotation of the second foldable section is counter-clockwise relative to the central body. However, in some embodiments, the direction of rotation of the first foldable section may be counter-clockwise relative to the central body, and the direction of rotation of the second foldable section may be clockwise relative to the central body. The rotational axes of the first and second foldable sections may be parallel to the yaw axis of the central body.

After the arms have been folded toward the respective sides of the central body, the arms and also the UAV are transformed into the compact configuration, as shown in Part C of FIG. 1. Each arm may be substantially parallel to the corresponding side of the UAV when in the compact configuration. For example, a plurality of foldable sections of each arm may be substantially parallel to one another (for example, the first foldable section may be parallel to the second foldable section) when the arm is in the compact configuration. In some embodiments, the propellers or rotor blades supported by the distal end of the arm may be parallel to the arm and therefore also parallel to the corresponding side of the UAV, which further reduces the footprint and space occupied by the UAV.

In some embodiments, in addition to being parallel to the corresponding side of the UAV, each arm may be received or accepted into the central body of the UAV. For example, a cavity, a compartment, or the like may be arranged at each side or edge of the UAV. The cavity or compartment may be configured (e.g., sized) to partially or entirely accept the arm. In this way, the arms may be enclosed within the central body instead of being exposed, which can protect the arms from possible damage during transportation of the UAV. The compact configuration also reduces the footprint of the UAV and allows the UAV to be carried around easily.

For example, when in the compact configuration, the UAV may be readily carried by a human, for example, using a single hand, or placed into a pocket or a knapsack. In some instances, the size or volume of the folded UAV may be similar to that of a mobile handset. Accordingly, the various embodiments of the disclosure allow the mobility and portability of the UAV to be improved. Further, manufacturers, providers, or vendors of the UAVs can package and store a large number of UAVs with foldable arms, since the space occupied is significantly reduced when the UAVs are in the compact configuration.

Part D of FIG. 1 schematically illustrates another intermediate or transitional configuration from the compact configuration to the flight configuration. The transitional configuration shown in Part D may be considered as a reverse process to the one shown in Part B. As can be seen in Part D, each arm of the UAV is being extended out from a corresponding side of the UAV. In particular, the first foldable section may be rotated by actuation of the actuator mechanism in a counter-clockwise direction relative to the central body, and the second foldable section may be rotated by actuation of the actuator mechanism, coupled with pulling of the chain mechanism in a clockwise direction relative to the central body.

The transitional configuration shown in Part D may be effected by a user operating the UAV. For example, the user may press a control button on board the UAV, particularly on the central body to initiate extension of the arms for a flight mission. In contrast, the user may click a control button displayed on a touchscreen of the remote controller via a user interface to launch unfolding operations. Upon receipt of an initiation instruction, the UAV may automatically unfold or extend the arms from the central body. The unfolding operations may continue until a first angle between the first foldable section and the corresponding side of the central body, and a second angle between the second foldable section and the first foldable section, respectively reach a given or expected degree. For example, for the central body having a square shape, the first angle may be substantially 135 degrees and the second angle may be substantially 180 degrees, as shown in Part A of FIG. 1, such that the first foldable section and the second foldable section are collinear to one another. When the first and second foldable sections are respectively rotated to the given degrees, each arm may be in the flight configuration such that the UAV may be ready for use or operation, for example, for an actual flight.

It is to be understood that the folding or unfolding operations of the arms may be set or configured according to different user preferences, according to various embodiments of the disclosure. For example, the folding operations may commence before, during, or after the UAV has landed. In some cases, the unfolding operations may commence immediately after a flight mission has been initiated. In some instances, the folding and unfolding operations may be controlled by an operator of the UAV, for example, by pressing one or more control buttons arranged on a remote controller or on the central body, or by touching one or more graphical interface boxes that are shown on a display of the remote controller or displayed on a screen of a separate remote controller.

In addition to having main components, such as the central body, the arms and the propulsion units as shown in FIG. 1, the UAV may have one or more sensors built in or mounted on the central body or arranged on or within one or more arms, for example, within or on the first and second foldable sections. In some instances, the UAV may comprise one or more vision sensors such as an image sensor for image capturing, image recognition, and/or obstacle avoidance. For example, an image sensor may be a monocular camera, a binocular camera, a stereo vision camera, radar, sonar, or an infrared camera. The UAV may further comprise other sensors capable of determining a location of the UAV, such as global positioning system (GPS) sensors, inertial sensors which may be used as part of or separately from an inertial measurement unit (IMU) (e.g., accelerometers, gyroscopes, magnetometers), lidar, ultrasonic sensors, acoustic sensors, WiFi sensors and the like.

In some embodiments, the UAV may have on-board sensors that may collect information directly from an environment without requiring communication with a component off board the UAV for additional information or processing. For example, a sensor that collects data directly in an environment can be a vision or audio sensor. Additionally or alternatively, the UAV may have sensors that are on board the UAV but may be in communication with one or more components off board the UAV to collect data about an environment. The sensor may include a GPS sensor or another sensor that is in communication with another device, such as a satellite, tower, router, server, or other external device.

As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera).

Any description herein with regards to the UAV may apply to any type of movable object. The description of a UAV may apply to any type of unmanned movable object (e.g., which may traverse the air, land, water, or space). The UAV may be capable of responding to commands from a remote controller. The remote controller may be not physically connected to the UAV but may communicate with the UAV wirelessly from a remote distance. In some instances, the UAV may be capable of operating autonomously or semi-autonomously.

The UAV may be capable of following a set of pre-programmed instructions regarding folding or unfolding operations of the arms. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters. The one or more commands may be formatted or programmed to instruct the UAV to extend the foldable arms prior to flight of the UAV, or retract the foldable arms subsequent to flight of the UAV. The extension and retraction of the foldable arms according to various embodiments of the disclosure may be implemented automatically or semi-automatically without manually folding or unfolding of the arms.

As previously described in FIG. 1, a UAV may be in a flight configuration or a compact configuration. The UAV may have a large size when it is in the flight configuration, and may have a relatively smaller size when it is in the compact configuration. A footprint of the UAV may be larger in the flight configuration compared to the compact configuration. The height or thickness of the UAV may or may not change when the UAV transitions between the compact configuration and the flight configuration.

Figure 2:
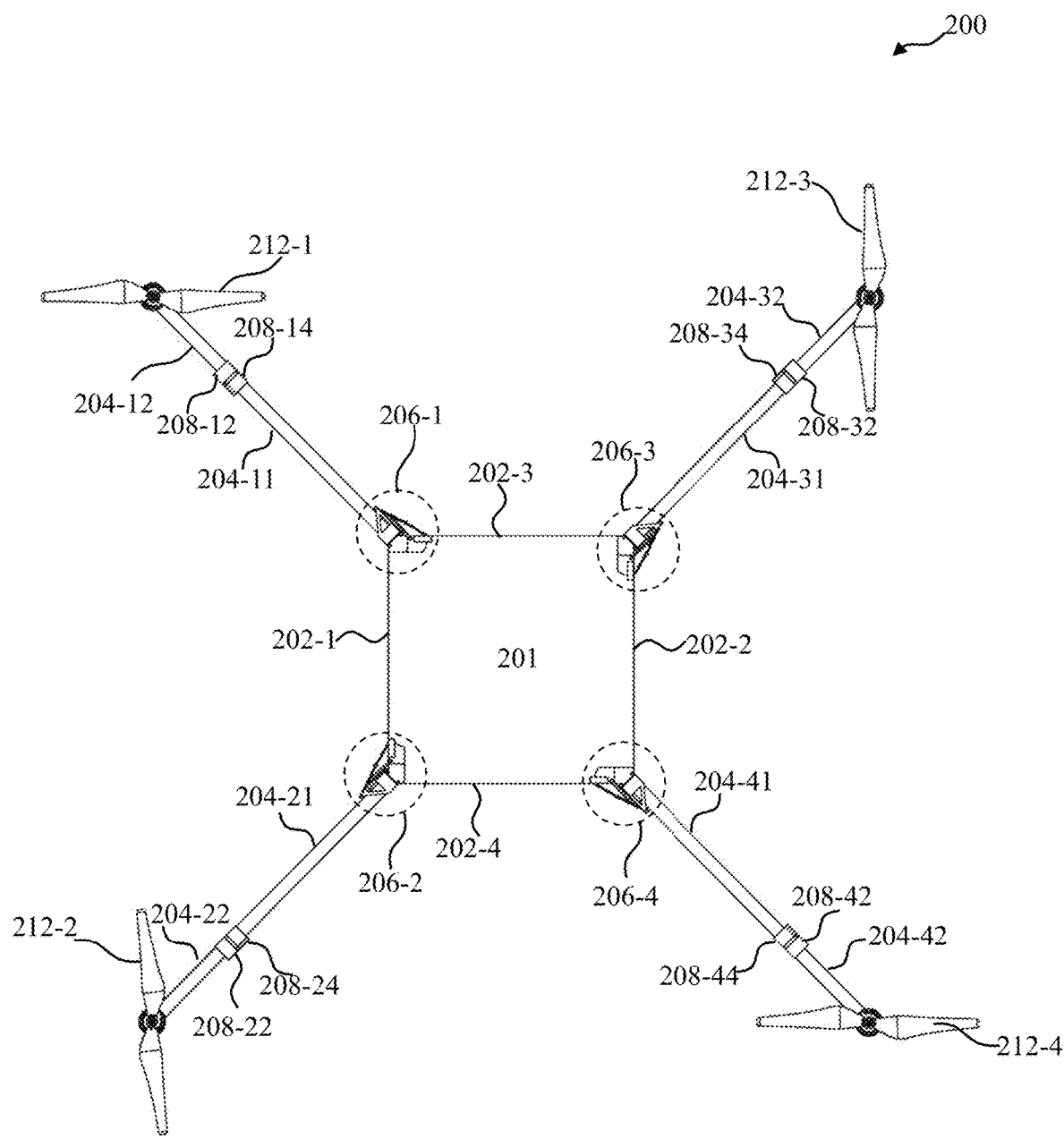
FIG. 2 illustrates a schematic view of a UAV with its arms in a flight configuration, in accordance with an embodiment of the disclosure.

FIG. 2 illustrates a schematic view of a UAV 200 when its arms are in a flight configuration, in accordance with an embodiment of the disclosure. It would be apparent that the UAV 200 may be operated similarly to the UAV 100 in FIG. 1. Accordingly, any description with reference to the UAV 100 in FIG. 1 may likewise be applicable to the UAV 200 in FIG. 2.

As illustrated in FIG. 2, the UAV 200 may comprise a central body 201 having a plurality of sides 202, such as 202-1, 202-2, 202-3 and 202-4, and a plurality of arms 204, each of which may comprise a plurality of foldable sections, such as 204-11, 204-12, 204-21, 204-22, 204-31, 204-32, 204-41 and 204-42. Similar to that previously discussed with reference to FIG. 1, each arm may comprise a pair of foldable sections, e.g., a first foldable section (e.g., 204-11, 204-21, 204-31 and 204-41) and a second foldable section (e.g., 204-12, 204-22, 204-32 and 204-42). The first foldable section may include a proximal end of the arm that is connected to the central body via a first connecting mechanism 206, such as 206-1, 206-2, 206-3, and 206-4 as illustrated. The second foldable section may include a distal end of the arm that is connected to and configured to support a propulsion unit 212, such as 212-1, 212-2, 212-3 and 212-4 as illustrated. The first foldable section and the second foldable section may be movably connected to one another via a second connecting mechanism 208, which may comprise two parts, for example, (208-12, 208-14), (208-22, 208-24), (208-32, 208-34) and (208-42, 208-44). In some embodiments, the first connecting mechanism may include an actuator mechanism, such as 206-10 illustrated in FIG. 4. The second connecting mechanism may include a chain mechanism, such as 206-15 illustrated in FIGS. 4 and 5. The actuator mechanism and the chain mechanism may collectively effect the arm to transform between the flight configuration and the compact configuration.

As shown in FIG. 2, each arm of the UAV 200 is fully unfolded and extended away from the central body such that the arm and also the UAV are in the flight configuration. In some embodiments, the flight configuration may result from actuation of the actuator mechanism in conjunction with the chain mechanism. The operation of the actuator mechanism and the chain mechanism is next described in detail with reference to FIGS. 3 through 5.

Figure 3:
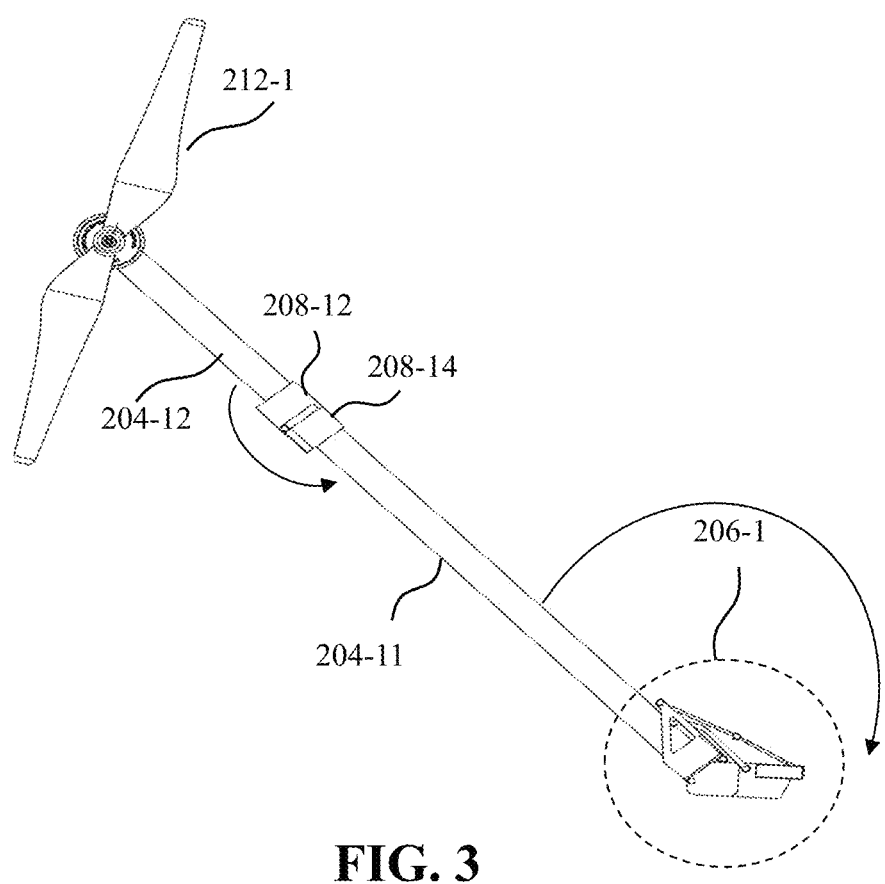
FIG. 3 illustrates a schematic view of an arm having an actuator mechanism, in accordance with an embodiment of the disclosure.

FIG. 3 illustrates a schematic view of an arm having an actuator mechanism in accordance with embodiments of the disclosure.

Figure 5:
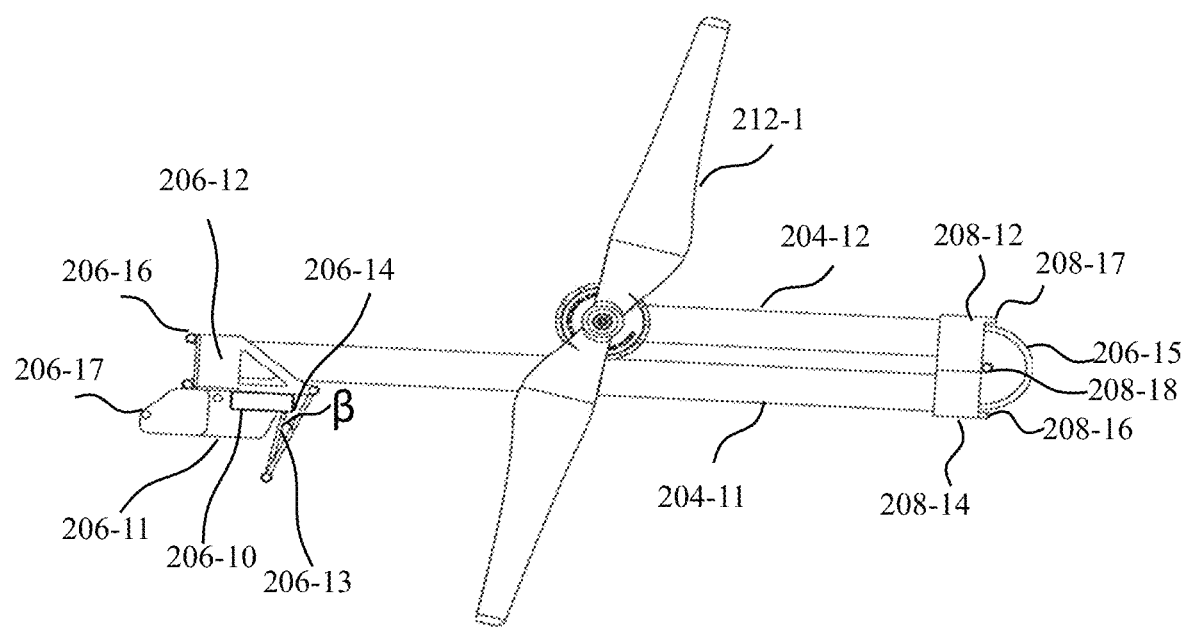
FIG. 5 illustrates a schematic top view of the arm shown in FIG. 3, in accordance with an embodiment of the disclosure.

As previously described, actuation of the actuator mechanism 206-15 may cause each arm of the UAV to be folded toward a corresponding side of the central body such that the first and second foldable sections are parallel to one another, thereby transforming the arm into the compact configuration, for example as shown in FIG. 5. Conversely, a reverse actuation of the actuator mechanism may cause each arm of the UAV to be extended away from the corresponding side of the central body, thereby transforming the arm into the flight configuration. In some embodiments, the second foldable section may be rotated away from the first foldable section such that the first and second foldable sections are collinear to one another, for example as shown in FIG. 3.

Figure 4:
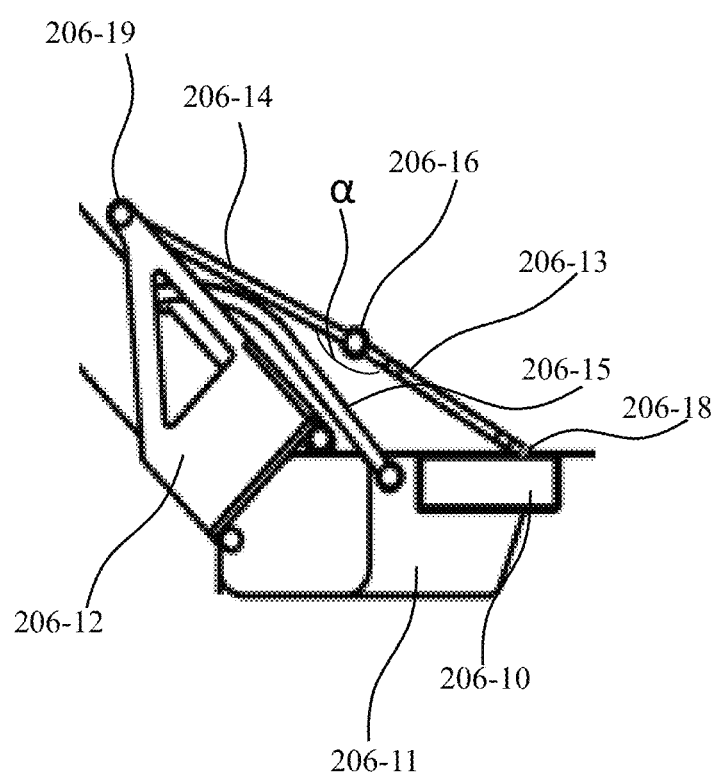
FIG. 4 illustrates an enlarged view of the actuator mechanism shown in FIG. 3, in accordance with an embodiment of the disclosure.

FIG. 4 illustrates an enlarged view of the first connecting mechanism shown in FIG. 3, in accordance with an embodiment of the disclosure. It should be understood that the following descriptions regarding the first connecting mechanism and its constituent components are only for illustrative purposes and any other technical implementations may also be contemplated in view of the teaching provided by the embodiments of the disclosure.

As schematically illustrated in FIG. 4, the first connecting mechanism 206-1 may comprise multiple assemblies and mechanisms, which may comprise an actuator mechanism 206-10, a fixing base 206-11, a support component 206-12, a portion of a chain mechanism 206-15, a linkage mechanism including a pendulum assembly 206-13 and a pendulum connector 206-14, which are movably connected to one another at a joint 206-16.

In some embodiments, the first connecting mechanism including the actuator mechanism may be initially connected with the arm (for example, to a first foldable section of the arm), and then detachably connected to the central body. In some other embodiments, the first connecting mechanism including the actuator mechanism may be initially attached to the central body, and the arm (for example, the first foldable section of the arm) may then be attached to the first connecting mechanism.

In some embodiments, the multiple assemblies and mechanisms of the first connecting mechanism may be connected with each other and assembled as a whole for latter attachment to both the central body and the arm (for example, to the first foldable section of the arm). Therefore, the first connecting mechanism according to embodiments of the disclosure may allow a user to easily assemble the UAV for use, and disassemble the UAV for transportation or storage.

The actuator mechanism may comprise one or more actuators for actuating or driving an arm having multiple foldable sections to (1) extend away from a central body of the UAV in the flight configuration and (2) fold or retract toward the central body of the UAV in the compact configuration. In some embodiments, the actuator mechanism may include one or more motors, such as a servo motor, for actuating a servo pendulum, which may be a specific form of the pendulum assembly, to drive the arm to unfold or fold according to the operations of the UAV, for example, when the UAV is flying in the air or preparing to land on the ground. In some embodiments, when the servo motor rotates, its torque may be directly transferred to the servo pendulum for driving the arm to extend or retract laterally. Additionally or alternatively, the servo motor may be attached to the servo pendulum through a torque coupling mechanism. In some implementations, the actuator mechanism may include a heteraxial large torque servo that is secured to the fixing base, which may be attached to the central body by any suitable coupling mechanisms, such as a screw, a clip, a fastener, or other mechanical connection mechanism. The output of the heteraxial large torque servo may be connected to the pendulum assembly for driving the arm to laterally fold or unfold. For example, when the arm is actuated by the heteraxial large torque servo to transfer from the flight configuration to the compact configuration, the first foldable section may be rotated in a clockwise direction toward the central body and the second foldable section may be rotated toward the first foldable section in a counter-clockwise direction such that the arm is folded parallel to a corresponding side of the central body, such as those shown in FIGS. 5 and 8.

As illustrated in FIG. 4, one end of the support component may be fixedly connected with the first foldable section and another end of the support component may be rotatably connected with the fixing base by a hinged structure or mechanism. The hinged structure or mechanism may allow the first foldable section to pivot about the fixing base by a predetermined degree, for example, about 135 degrees for a central body having a square shape, about 120 degrees for a central body having a hexagonal shape, and about 112.5 degrees for a central body having an octagonal shape. In some embodiments, a mating section, such as 206-17 in FIG. 5, may be arranged on the support component or the central body. A stopper, such as 206-16 in FIG. 5, may be arranged on each arm such that a vibration of each arm relative to a yaw axis of the UAV may be minimized when the stopper and the mating section are mated with one another in the flight configuration, such as those shown in FIGS. 3 and 4.

As schematically illustrated, one end of the pendulum assembly, as a constituent component of the linkage mechanism, may be hingedly connected to the fixing base at a first joint 206-18. The hinged end may be rotatably fixed onto an output shaft of the actuator mechanism, for example, a rotating shaft of a heteraxial large torque servo, which may be a specific form of the actuator mechanism. The pendulum assembly, which may include a servo pendulum, may pivot about the rotating shaft of the heteraxial large torque servo. Accordingly, the torque generated by the heteraxial large torque servo may be transferred from the servo pendulum to the first foldable section of the arm via the pendulum connector, which may be hingedly connected to the arm via the support component at a second joint 206-19 and may be hingedly connected to the pendulum assembly at a third joint 206-16. In this manner, the first foldable section of the arm, e.g., the first foldable section 204-11, may laterally rotate relative to the central body or the fixing base.

The linkage mechanism, as described above using the pendulum assembly and the pendulum connector as examples for illustrative purposes, may be actuated by one or more actuators, such as the actuator mechanism 206-10, to transform between a first dead center position and a second dead center position. When the linkage mechanism is at the first dead center position as schematically illustrated in FIG. 4, the arm may be secured in the flight configuration. In contrast, when the linkage mechanism is at the second dead center position as schematically illustrated in FIG. 5, the arm may be secured in the compact configuration.

In some embodiments, the first dead center position may be formed when at least two connecting bars (e.g., the pendulum assembly and the pendulum connector) in the linkage mechanism are disposed at a first angle (e.g., "α" as illustrated in FIG. 4) relative to one another when the arm is in the flight configuration. In some instances, the first angle may be an obtuse angle. For example, the first angle may be greater than about 90 degrees, 100 degrees, 110 degrees, 120 degrees, 130 degrees, 140 degrees, 150 degrees, 160 degrees, 170 degrees, less than about 180 degrees, or any value therebetween. In some embodiments, the second dead center position may be formed when the at least two connecting bars in the linkage mechanism are disposed at a second angle (e.g., "β" as illustrated in FIG. 5) relative to one another when the arm is in the compact configuration. In some instances, the second angle is an acute angle. For example, the second angle may be greater than about 0 degree, 10 degrees, 20 degrees, 30 degrees, 40 degrees, 50 degrees, 60 degrees, 70 degrees, 80 degrees, less than about 90 degrees, or any value therebetween. It is noted that the pendulum component and the pendulum connector may remain dormant with respect to one another at the moment when the first and second dead center positions have been formed. Accordingly, the ability of the arm to stay rigid in the presence of externally-induced movement or vibration may be improved, thereby enhancing the stability of the UAV.

As previously described, the linkage mechanism may have two ends, for example a first end and a second end. The first end of the linkage mechanism may be rotatably connected to the arm, and the second end of the linkage mechanism may be rotatably connected to one or more actuators, such as the actuator mechanism described above. In some embodiments, the first end of the linkage mechanism may be rotatably connected to a first foldable section of an arm (e.g., a foldable section including a proximal end of the arm). Although schematically illustrated as having two linkage bars, in some embodiments, the linkage mechanism may comprise at least one of a two-bar linkage mechanism and a four-bar linkage mechanism.

In some further embodiments, the linkage mechanism may comprise a first joint (e.g., the first joint 206-18) for connecting to the one or more actuators, such as the actuator mechanism described above and a second joint (e.g., the second joint 206-19) for connecting to the arm. A distance between the first joint and the second joint may be changed as the linkage mechanism is actuated between the first dead center position and the second dead center position. In some embodiments, the distance between the first joint and the second joint may be substantially equal to a length of the linkage mechanism when the linkage mechanism is at the first dead center position. In some embodiments, the distance between the first joint and the second joint may be less than a length of any one of connecting bars of the linkage mechanism when the linkage mechanism is at the second dead center position.

Depending on whether the linkage mechanism is at the first dead center position or at the second dead center position, the plurality of foldable sections of each arm may be in different configurations. For example, the plurality of foldable sections may be extended away from the central body when the linkage mechanism is in the first dead center position. In addition, the plurality of foldable sections may be folded substantially parallel to one another when the linkage mechanism is in the second dead center position.

As illustrated in FIG. 5, the second connecting mechanism 208, which may hingedly connect the first foldable section and the second foldable section, may include a first hinged base 208-12 and a second hinged base 208-14 hingedly connected with one another at a joint 208-18. A first end of the chain mechanism 206-15 may be attached to the second foldable section via the first hinged base. A second end of the chain mechanism may be attached to the central body via the fixing base using, e.g., a hinged connection. The first hinged base may be fixedly connected to the second foldable section, and the second hinged base may be fixedly connected to the first foldable section. The fixed connections may be implemented using, for example, mechanical adjustable fasteners, adhesives, or one or more mating connections, quick release mechanisms, hooks, or any suitable combination thereof. The first foldable section and the second foldable section are hingedly connected with one another via the joint 208-18.

In some embodiments, a chain mechanism may comprise a plurality of sequentially-connected chain units. Additionally or alternatively, the chain mechanism may comprise a drag chain or a multi-linkage mechanism. In some implementations, the drag chain may be a cable drag chain through which a power cable for powering the one or more propulsion units passes, for example as schematically illustrated in FIG. 8. In some implementations, the multi-linkage mechanism may comprise a plurality of linkage mechanisms that are sequentially rotatably connected with each other. A rotating axis of each linkage mechanism may be substantially perpendicular to a longitudinal axis of the linkage mechanism.

In some embodiments, the plurality of foldable sections in each arm may comprise one or more hollow foldable sections such that the chain mechanism may pass through the hollow foldable sections.

In operation, when the arm starts to transform from a compact configuration (e.g., shown in Part C of FIG. 1 and FIG. 5) to a flight configuration (e.g., shown in Part A of FIG. 1 and FIG. 3), the chain mechanism may draw or push a second foldable section of an arm to rotate relative to a first foldable section in a first direction until both the first and second foldable sections reach a predetermined angle or are collinear to one another. Similarly, when the arm starts to transform from the flight configuration to the compact configuration, the chain mechanism may draw or pull the second foldable section to rotate relative to the first foldable section in a second direction until both the first foldable and second foldable sections are substantially parallel to one another.

In some embodiments, the first direction may be counterclockwise with respect to the central body, and the second direction may be clockwise with respect to the central body. Conversely, the first direction may be clockwise with respect to the central body, and the second direction may be counterclockwise with respect to the central body. In some instances, the second foldable section may be folded via the chain mechanism to the extent that it may abut tightly against the first foldable section, thereby further reducing the space occupied by the UAV.

In some embodiments, instead of or in addition to using the chain mechanism described above, a pulley structure or a spring structure may be arranged to draw or pull the second foldable section to open or close relative to the first foldable section. In addition, the chain mechanism may be made from an elastic ribbon or belt, which can provide elasticity for drawing the second foldable section in opposite directions.

In some embodiments, the first foldable section of the arm may be hollow, such that the chain mechanism may pass through the first foldable section and is fixedly connected to the second foldable section. The chain mechanism can drive the second foldable section to rotate relative to the first foldable section. In some instances, the chain mechanism may pass through and exit the first foldable section, such that a part of the chain mechanism is exposed in a curved manner outside of the first foldable section when the arm is in the compact configuration, for example as schematically illustrated at 206-15 in FIG. 5. In some instances, the part of the chain mechanism that is exposed outside when the arm is in the compact configuration, may be received and straightened inside the second foldable section when the arm transforms to the flight configuration.

In some embodiments, to improve strength of the connection, a first limiter 208-16 may be arranged on a first end of the first foldable section and a second limiter 208-17 may be arranged on a second end of the second foldable section. The first end and second end may be adjacent to one another, and may mate or engage with one another in the flight configuration using the first and second limiters. For example, the first limiter and the second limiter may be abutted against one another, thereby restricting (relative) movement of the first and second foldable sections in the flight configuration, for example, when the two sections are collinear to one another. In some implementations, the first and second limiters may be arranged to be vertically stacked relative to a yaw axis of the UAV while in the flight configuration. Alternatively or additionally, the first and second limiters may be arranged to be horizontally stacked relative to a yaw axis of the UAV while in the flight configuration.

A first end of the second foldable section may be attached to a motor. A shaft of the motor may drive a propeller (e.g., 212-1 in FIGS. 3 and 5) to rotate, thereby providing lift to enable UAV flight. The wiring in a propulsion system or unit (e.g., the brushless motor described above) may be routed through the first and second foldable sections to connect to corresponding units or systems (e.g., a flight control system or an Electronic Speed Control unit (ESC)). The flight control system or the ESC may be configured to vary the speed of the one or more motors.

The propellers may be pivotally coupled to a output shaft of the motor, such as a brushless motor, and may work with the motor to drive the rotor blades to rotate such that the UAV may be thrusted to move or accelerate in one or more directions, or rotate in one or more rotation of axes, such as in a pitch, a yaw, and/or a roll axis.

The joint formed in the hinged connection described elsewhere herein may be a hinge, a ball-and-socket, or a sliding joint. In some cases, the joint may comprise a threaded connection, a pin connection, a magnetic connection, a flange connection, or any other form of mechanical coupling that can enable relative movements of the first and second foldable sections in each arm. In some embodiments, the joint may be hollow or have one or more internal passages or cavities.

In some embodiments, one or more sensory devices or components (not shown in figures), such as various sensors, may be mounted on or built or embedded into the arm, and used for sensing the folding positions of the arm. In some instances, the sensors may sense positions (or relative positions relative to a suitable reference location) of the first foldable section and the second foldable section, and transmit the sensed positional data to a controller on board the UAV. Based on the sensed positional data, the controller may instruct one or more driving units, such as the actuator mechanism as described elsewhere herein, to stop driving when one or more predetermined positions are reached. The predetermined positions may include, for example, (i) the two foldable sections being parallel to one another in the compact configuration, (ii) the two foldable sections being collinear to one another in the flight configuration, (iii) the first dead center position being formed in the flight configuration, or (iv) the second dead center position being formed in the compact configuration. In some implementations, when the sensors sense or detect that multiple sections of the arm are folded and collinear or that the first dead center position is reached, the sensors may then transmit a first signal to the actuator mechanism via a trigger switch or a limit switch, to instruct the actuator mechanism to stop actuating or driving. Similarly, when the sensors are sensing that multiple sections of the arm are nearly parallel to one another and the second dead center position is reached, the sensor may transmit a second signal to the actuator mechanism to stop driving. Accordingly, the folding and unfolding of the arms can be carried out automatically using the sensors and the actuation mechanism without requiring a user to manually fold or unfold the arms of the UAV.

Figure 6:
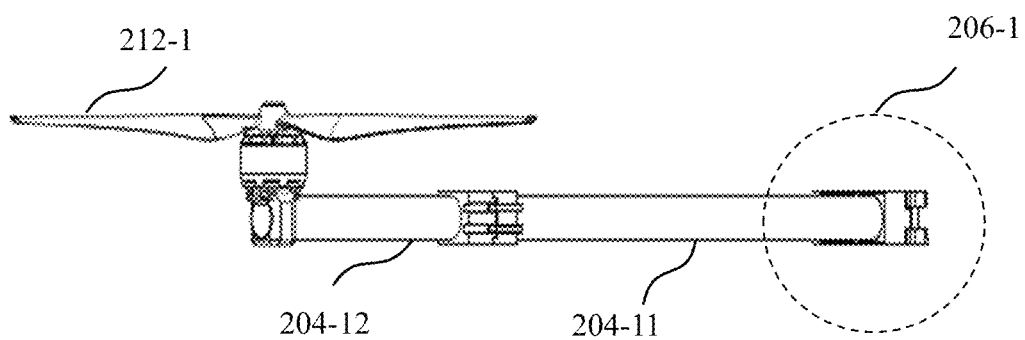
FIG. 6 illustrates a schematic lateral view of the arm shown in FIG. 3, in accordance with an embodiment of the disclosure.

FIG. 6 illustrates a schematic lateral view of an arm as illustrated in FIG. 3, in accordance with an embodiment of the disclosure. A long rod (e.g., a first foldable section 204-11) and a short rod (e.g., a second foldable section 204-12) of the arm are movably connected with one another via a hinged connection at a joint. A proximal end of the arm (e.g., one end of the long rod adjacent to the central body) may be coupled to a central body (not shown) of the UAV via an actuator mechanism, such as the actuator mechanism 206-10. A distal end of the arm (e.g., one end of the short rod distal to the central body) may support one or more propulsion units (e.g., the propulsion unit 212-1), with a pair of rotor blades being supported by a motor. The rotation of the rotor blades may provide thrust forces for lifting the UAV to hover in the air. The multiple foldable sections of the arm according to the embodiments of the disclosure may be customized in terms of their size, the number, the volume and so forth, and may be manufactured and assembled independently of the central body. For example, the first and second foldable sections of the arm may be detached and packaged in a box, and then reassembled on site with the central body. In this manner, it would be easy for the UAV manufacturer, provider, or users to maintain, change, replace or repair the damaged or faulty arms.

Figure 7:
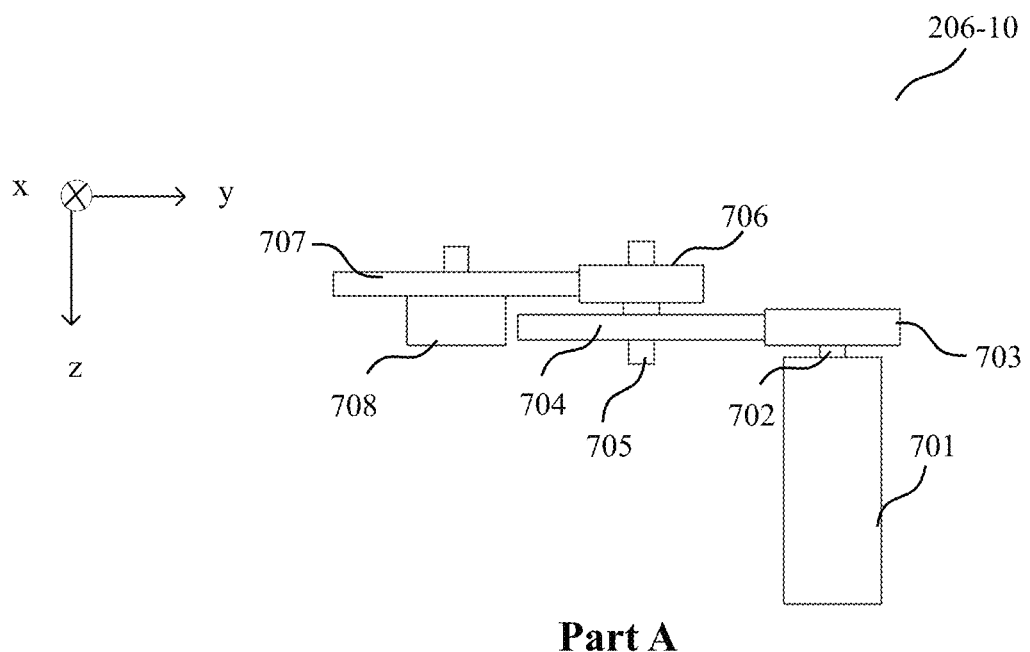
FIG. 7 illustrates schematic views of an actuator mechanism for enabling folding and extending of the arms, in accordance with embodiments of the disclosure.
Figure 7:
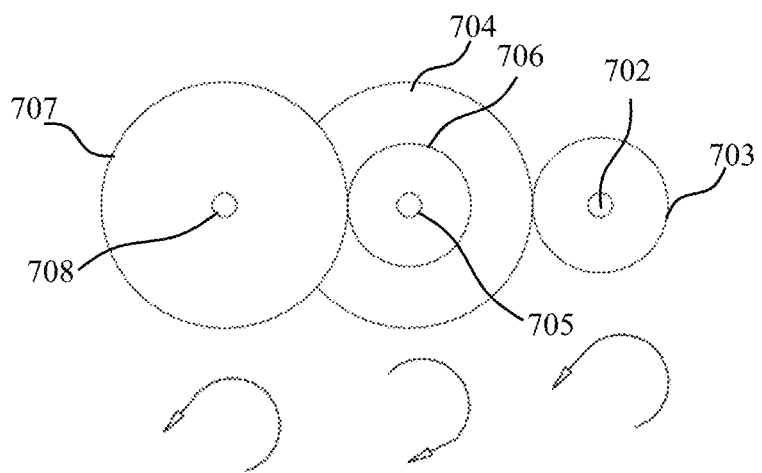

FIG. 7 illustrates schematic views of an actuator mechanism (e.g., the actuator mechanism 206-10) to enable folding and extending of the arms, in accordance with embodiments of the disclosure.

As schematically illustrated in Part A of FIG. 7, the actuator mechanism may be implemented as a servomotor which may include one or more motors, such as an electric motor 701, and one or more gear trains. The electric motor may have an output shaft 702 carrying a motor gear 703. The motor gear may be adapted to rotationally drive rotatable means or gear, such as gears 704 and 706 which are concentric with a common shaft 705. The gear 704, after being driven by the output shaft from the motor gear, may be adapted to rotationally drive the gear 706 to rotate via the shaft 705. The rotation of the gear 706 may cause a gear 707 to rotate accordingly. An output shaft 708 may be driven to rotate and actuate other members, components, or the like. For example, the output shaft may be connected with a linkage mechanism, such as a pendulum assembly, as schematically shown at 206-13, via a hinged connection. The rotation of the final output shaft may drive the pendulum assembly to move back and forth laterally from the corresponding side of the central body, such that the first dead center position and the second dead center position may be formed in the flight configuration and the compact configuration, respectively.

Part B of FIG. 7 schematically illustrates variable directions of rotation of the actuation mechanism. As shown in part B, the output shaft of the motor may rotate in a counter-clockwise direction. Due to transmission of the motion, the output shaft may be driven to rotate in a counter-clockwise direction as a result of clockwise rotation of the middle gear (such as the gear 706). It is to be understood that the starting direction of rotation can be set and configured to be in either clockwise or counterclockwise direction. Further, the number of teeth of the gears or the power of the actuation mechanism may be predetermined or set based on a moving distance, a folding velocity, or an unfolding velocity of the arm. For instance, when high speed for folding or extending the arm is needed, an actuation mechanism having a relatively high power should be applied to provide more energy for the gears (or driving wheels in some implementations) such that the arm including multiple foldable sections may be folded or unfolded more quickly. Alternatively, when a precise folding of the arm is required, a driving gear with a small diameter may be used such that the movement of the arm around a rotational axis, such as a yaw axis of the UAV, may be accurately controlled.

Figure 8:
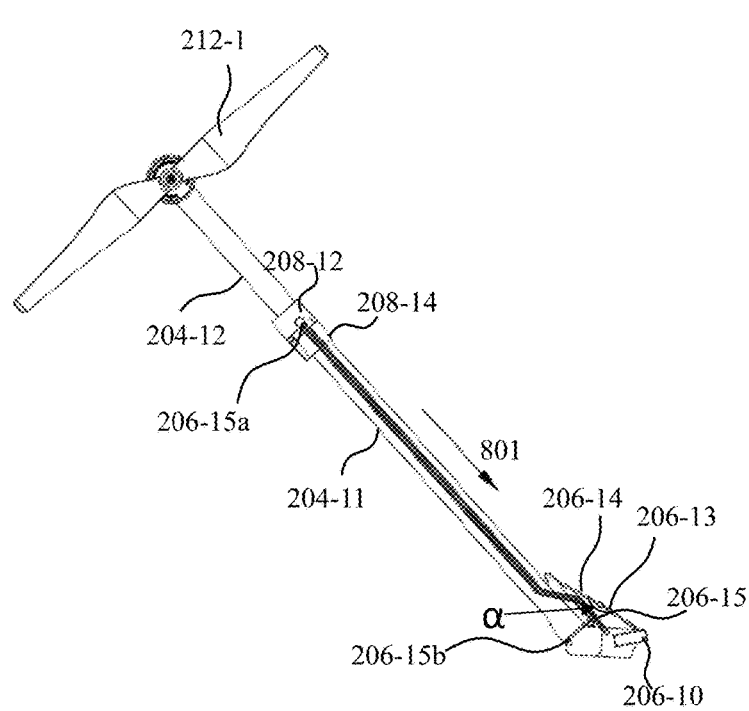
FIG. 8 illustrates schematic views of an arm having a chain mechanism, in accordance with an embodiment of the disclosure.
Figure 8:
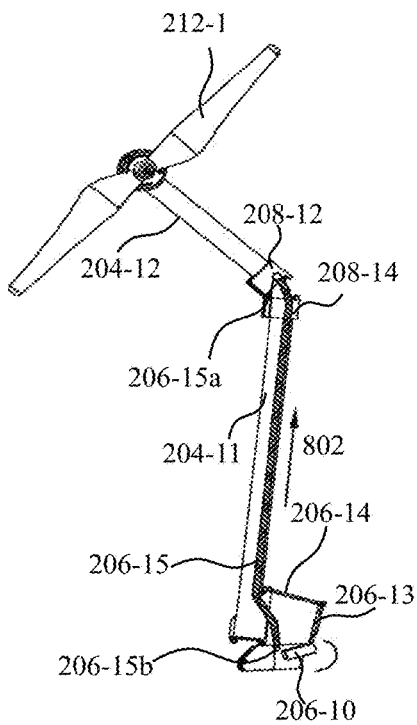
Figure 8:
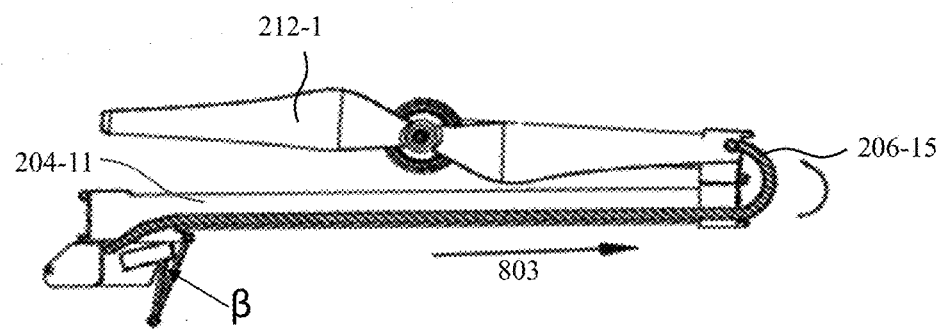

FIG. 8 illustrates schematic views of an arm having a chain mechanism, in accordance with an embodiment of the disclosure.

Part A of FIG. 8 is a sectional view of the single arm 204 in the flight configuration, i.e., fully extended away from the central body (not shown). A first end of the chain mechanism, e.g., 206-15a as shown, is attached to a second foldable section 204-12 via the first hinged base 208-12. A second end of the chain mechanism, e.g., 206-15b as shown, is coupled to the central body via the fixing base. The coupling may be implemented using a hinged connection. As previously described, in the flight configuration shown in Part A of FIG. 8, to further fasten the first foldable section and the second foldable section with respect to one another, the chain mechanism may apply a tensioning force with a direction toward the second end of the chain mechanism, as shown by an arrow 801. When transforming into the compact configuration, as illustrated in Part B of FIG. 8, the chain mechanism may apply a thrust force (as shown by an arrow 802) for the second foldable section of the arm. As the first foldable section of the arm is folded toward the corresponding side of the central body, the second foldable section may be progressively rotated about a joint (e.g., the joint 208-18) toward the first foldable section. Upon transforming into the compact configuration shown in Part C of FIG. 8, the first and second foldable sections of the arm, the rotor blade, and the corresponding side of the central body (not shown) may be parallel to one another. In some embodiments, the chain mechanism may continue to provide a thrust force as shown by an arrow 803, to ensure that the first and second foldable sections remain constant while the linkage mechanism, which is now in the second dead center position. The continued providing of the thrust force by the chain mechanism may help to further maintain the stability of the arm with respect to the central body.

In some embodiments, the chain mechanism may comprise a plurality of sequentially-connected chain units, which may be assembled together according to the lengths of the first and second foldable sections of the arm, the required thrust force, the required tensioning force, or the like. In some embodiments, the chain mechanism may comprise a drag chain or a multi-linkage mechanism. In some implementations, the drag chain may be a cable drag chain through which a power cable for powering the one or more propulsion units passes. In some implementations, the multi-linkage mechanism may comprise a plurality of linkage mechanisms that are sequentially rotatably connected with each other. A rotating axis of each linkage mechanism may be substantially perpendicular to a longitudinal axis of the linkage mechanism.

The chain mechanism may pass through one or more foldable sections having hollow bodies and may slide therein. In some embodiments, a length of the chain mechanism may be constant or unchanged during the sliding. Further, in some embodiments, the chain mechanism may pass through and out of the second foldable section, and a part of the chain mechanism may be exposed in a curved manner outside the second foldable section when the arm is in the compact configuration, for example as shown in Part C of FIG. 8. The exposed part of the chain mechanism may be received and straightened inside the second foldable section when the arm is in the flight configuration, for example as shown in Part A of FIG. 8. Through the actuation of the chain mechanism, the second foldable section may be rotated relative to the first foldable section. For example, the second foldable section may be rotated away from the first foldable section when the arm is in the flight configuration, and may be rotated toward the first foldable section when the arm is in the compact configuration.

Figure 9:
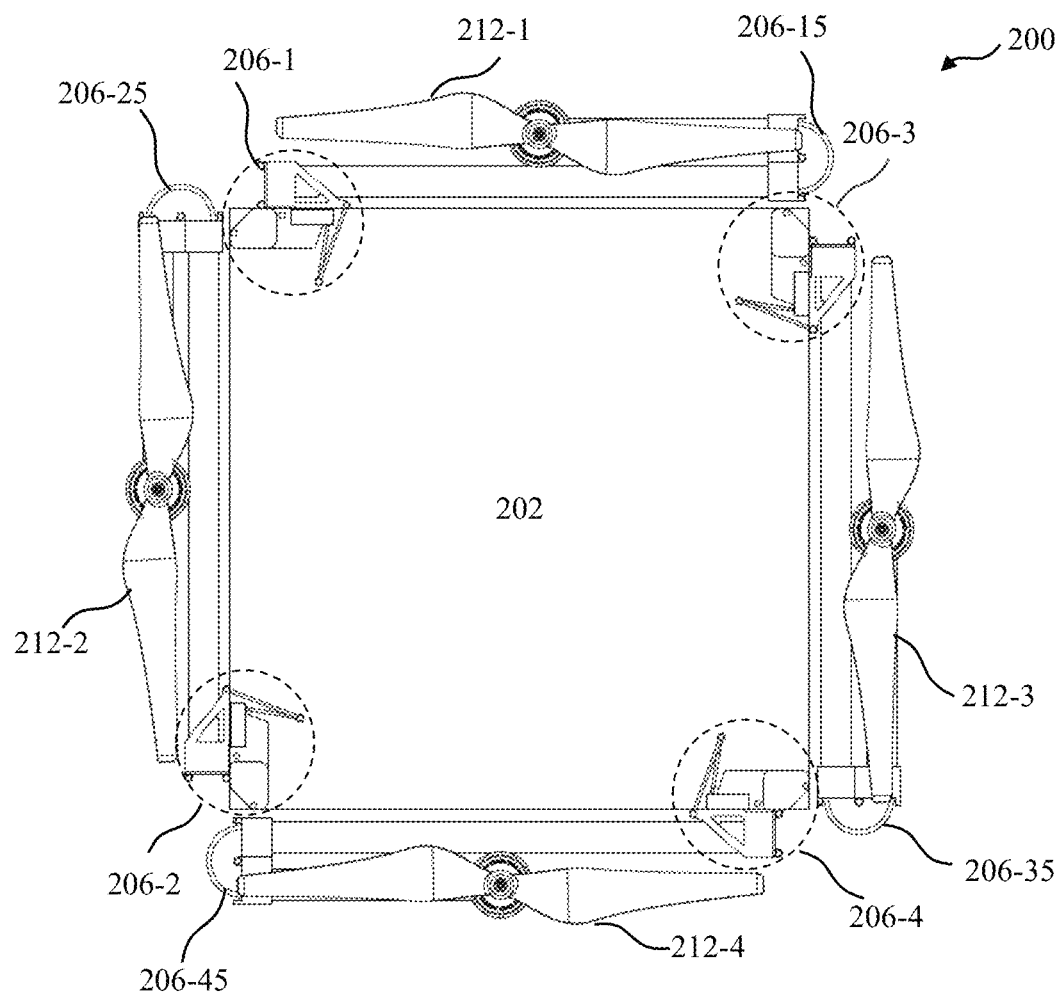
FIG. 9 illustrates a schematic view of the UAV shown in FIG. 2 with its arms fully folded in the compact configuration, in accordance with an embodiment of the disclosure.

FIG. 9 illustrates a schematic view of the UAV shown in FIG. 2 with its arms fully folded in the compact configuration, in accordance with an embodiment of the disclosure. As shown in FIG. 9, the four arms have been folded adjacent to the corresponding sides of the central body. The first foldable section of each arm may be folded parallel to the corresponding side of the central body, and the second foldable section of each arm may be folded parallel to the first foldable section and thus parallel to the corresponding side. Alternatively or additionally, the rotor blade may also be parallel to the first foldable section and the corresponding side, thereby further reducing the space occupied by the UAV in the compact configuration. A spread length of the rotor blade can be equal to or less than the length of the first foldable section or the corresponding side.

Figure 10:
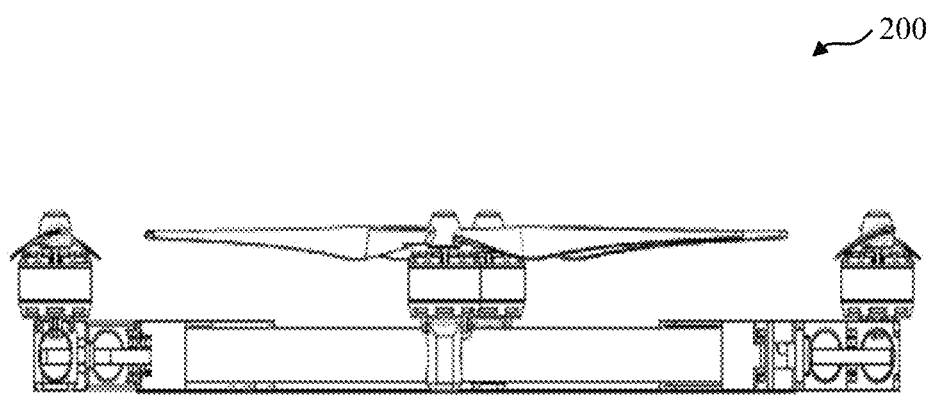
FIG. 10 illustrates a schematic lateral view of the UAV shown in FIG. 9, in accordance with an embodiment of the disclosure.

FIG. 10 illustrates a schematic lateral view of the UAV 200 shown in FIG. 9 in the compact configuration. As shown in FIG. 10, the thickness of the central body of the UAV may be the same as the thickness of the arms. Further, the rotor blades after being folded may be at the same height as the central body. Accordingly, the volume of the UAV in the compact configuration may be further reduced. As previously described, in some embodiments, one or more cavities or compartments may be arranged on or around the perimeter of the central body, or within the central body. Accordingly, the UAV in the compact configuration may have a box-like shape, which aids in carrying or transporting the UAV.

As previously described, a guiding member may be disposed or arranged on at least one of the plurality of foldable sections. The guiding member may assist one or more rotor blades to stop rotation in place. The guiding member is next described in detail with reference to FIG. 11.

Figure 11:
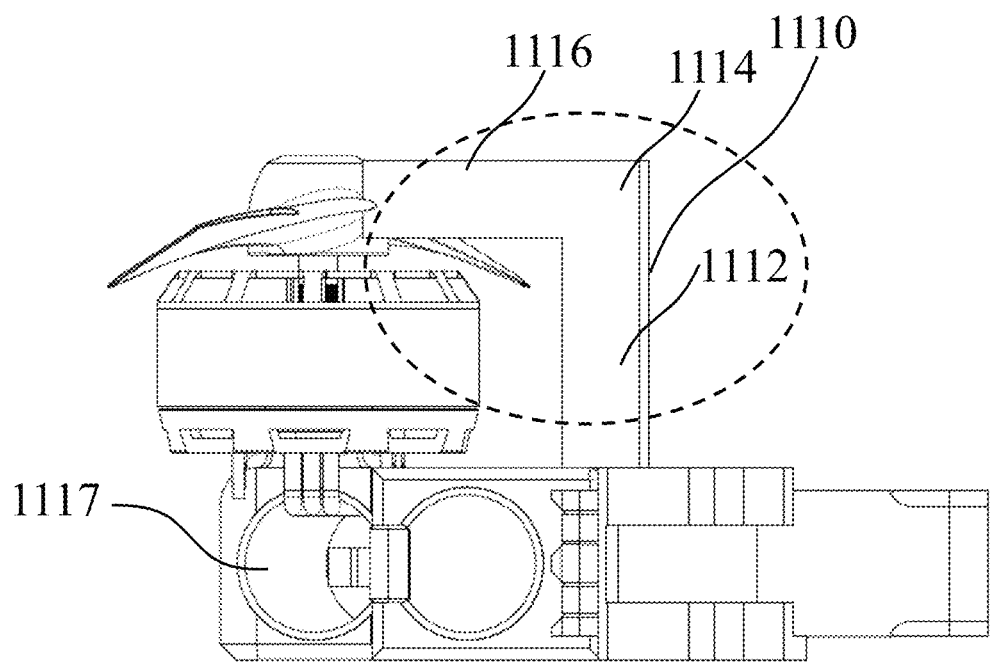
FIG. 11 illustrates a schematic view of an arm of a UAV having a guiding member arranged thereon, in accordance with an embodiment of the disclosure.

FIG. 11 illustrates a schematic view of an arm of a UAV having a guiding member arranged thereon, in accordance with an embodiment of the disclosure.

As illustrated in FIG. 11, a guiding member 1110 may comprise three portions, e.g., a first portion 1112, a second portion 1116, and a connecting portion 1114 arranged therebetween for connecting the first and second portions. The second portion may be connected to the first portion via the connecting portion using any suitable coupling means. For example, the portions may be fixed together using an adhesive. In some embodiments, the portions may be integrally formed. The first portion may be fixedly or detachably mounted on a first foldable section of an arm. This may be achieved using, for example, one or more fasteners such as nails, screws, bolts, clips, ties, and the like. In some implementations, each arm may be provided with a groove or a recess for receiving the guiding member. A user may use the guiding member for guiding the rotation of the rotor blades when the arm is about to enter into the compact configuration. If the guiding member is available, the user may insert the guiding member having a protrusion into the recess such that they are tightly coupled to one another. Alternatively, the user may screw the guiding member with an external thread into the recesses having an internal thread, such that they are threadedly engaged with one another. To mate with the rotor blade, the guiding member and the second portion may comprise an arced concave such that a distal end of the rotor blade may slide into and out of the arced concave as the arm transforms from the flight configuration to the compact configuration. In some embodiments, a spread length of the rotor blades may be equal to a length of the first foldable section.

In some embodiments, the guiding member may be positioned corresponding to a rotor hub of the rotor blade. In some instances, the guiding member may be positioned against the rotor hub when the arm is in the compact configuration. In some embodiments, the guiding member may be abutted against an end of the rotor blade when the arm is in the compact configuration. The guiding member may be made of any light-weight materials including, for example, titanium, titanium alloys, structural foam or carbon-fiber.

Figure 12:
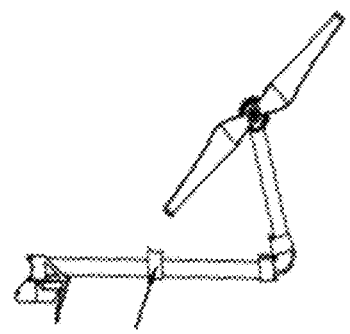
FIG. 12 illustrates schematic views of an arm of a UAV folded with aid of a guiding member, in accordance with embodiments of the disclosure.
Figure 12:
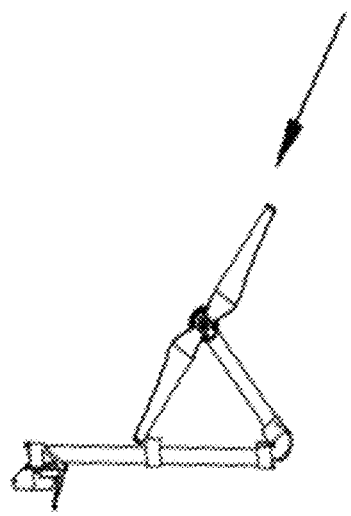
Figure 12:
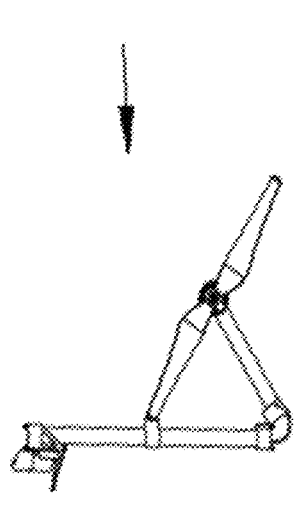
Figure 12:
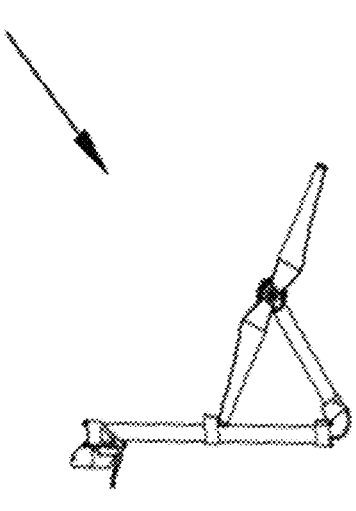
Figure 12:

FIG. 12 illustrates schematic views of an arm of a UAV that is folded with aid of a guiding member, in accordance with embodiments of the disclosure. The guiding member as illustrated in FIG. 12 may be similar to the guiding member shown in FIG. 11. Therefore, any previous description of the guiding member of FIG. 11 may also be applicable to the guiding member of FIG. 12.

As illustrated in Part A of FIG. 12, an arm, which may be similar to the arm shown in FIGS. 3 through 6, is about to enter into a compact configuration in which each foldable section is parallel to a corresponding side of a central body (not shown). Depending on a temporary contact point or line of a rotor blade with the guiding member, different transitional scenarios may occur as schematically illustrated in Parts B, C, and D of FIG. 12. For example, the distal end of the rotor blade may come into contact with the guiding member, e.g., at either one side of the guiding member, as schematically and respectively illustrated in Parts B and D of FIG. 12.

Additionally, the distal end of the rotor blade may first slide into or collide with a cavity at an open center of the guiding member, and may then slide out of the cavity as the arm is further folded toward the corresponding side. As the arm further folds toward the corresponding side of the central body, the rotor blades may rotate forward until the rotor blades, the first foldable section and the second foldable section are all parallel to the corresponding side of the central body of the UAV, for example as schematically shown in Part E of FIG. 12.

Figure 13:
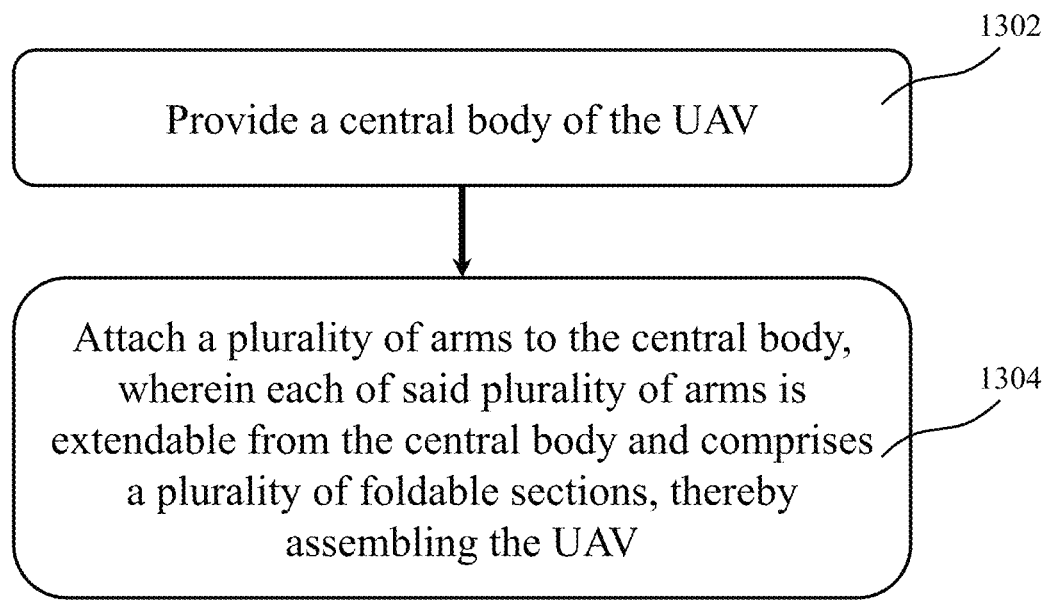
FIG. 13 illustrates a flow chart of a method for assembling a UAV, in accordance with an embodiment of the disclosure.

FIG. 13 illustrates a flow chart of a method for assembling a UAV, in accordance with an embodiment of the disclosure.

As illustrated in FIG. 13, at 1302, the method may comprise providing a central body of the UAV. Then at 1304, the method may further comprise attaching a plurality of arms to the central body, wherein each of the plurality of arms may be extendable from the central body and comprise a plurality of foldable sections, thereby assembling the UAV, wherein each of the plurality of arms may be configured to transform between (1) a flight configuration wherein the plurality of foldable sections in each arm are extended away from the central body and (2) a compact configuration wherein the plurality of foldable sections in each arm are folded toward a corresponding side of the central body such that the plurality of foldable sections are substantially parallel to one another.

Figure 14:
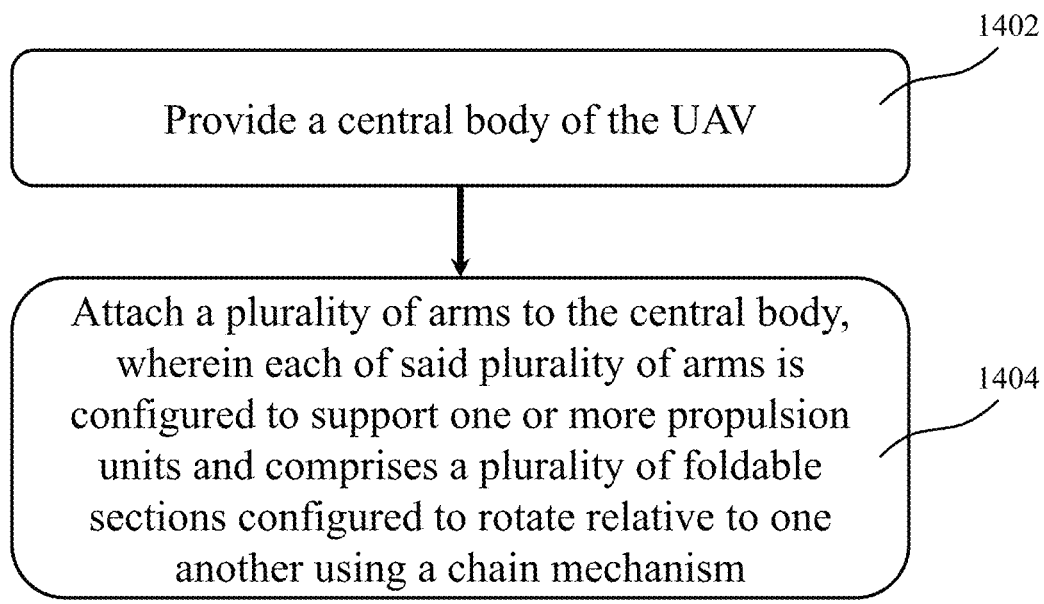
FIG. 14 illustrates a flow chart of a method for assembling a UAV, in accordance with another embodiment of the disclosure.

FIG. 14 illustrates a flow chart of a method for assembling a UAV, in accordance with another embodiment of the disclosure.

As illustrated in FIG. 14, at 1402, the method may comprise providing a central body of the UAV. Further, at 1404, the method may comprise attaching a plurality of arms to the central body, wherein each of the plurality of arms may be configured to support one or more propulsion units and comprise a plurality of foldable sections configured to rotate relative to one another using a chain mechanism, wherein the chain mechanism is configured to transform each arm between (1) a flight configuration wherein the plurality of foldable sections are extended away from one another, and (2) a compact configuration wherein the plurality of foldable sections are folded substantially parallel to one another.

Figure 15:
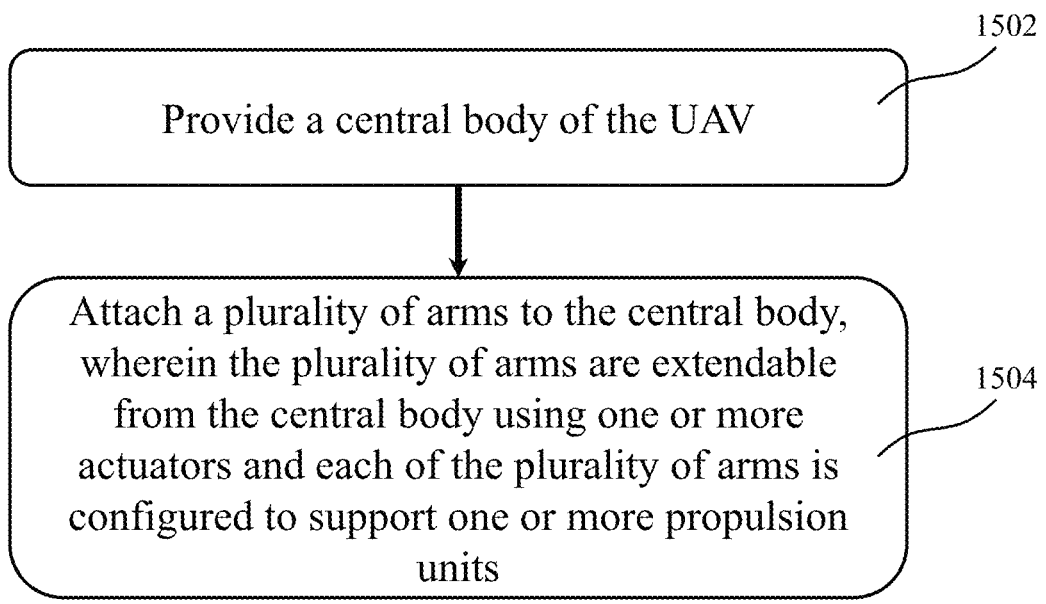
FIG. 15 illustrates a flow chart of a method for assembling a UAV, in accordance with a further embodiment of the disclosure.

FIG. 15 illustrates a flow chart of a method for assembling a UAV, in accordance with a further embodiment of the disclosure.

As illustrated in FIG. 15, at 1502, the method may comprise providing a central body of the UAV. Further, at 1504, the method comprise attaching a plurality of arms to the central body, wherein the plurality of arms may be extendable from the central body using one or more actuators and each of the plurality of arms may be configured to support one or more propulsion units, wherein each of the plurality of arms is configured to connect to each actuator via a linkage mechanism, wherein each actuator is configured to actuate the linkage mechanism between (1) a first dead center position for securing the arm when the arm is extended away from the central body in a flight configuration and (2) a second dead center position for securing the arm when the arm is folded substantially parallel to the central body in a compact configuration.

Figure 16:
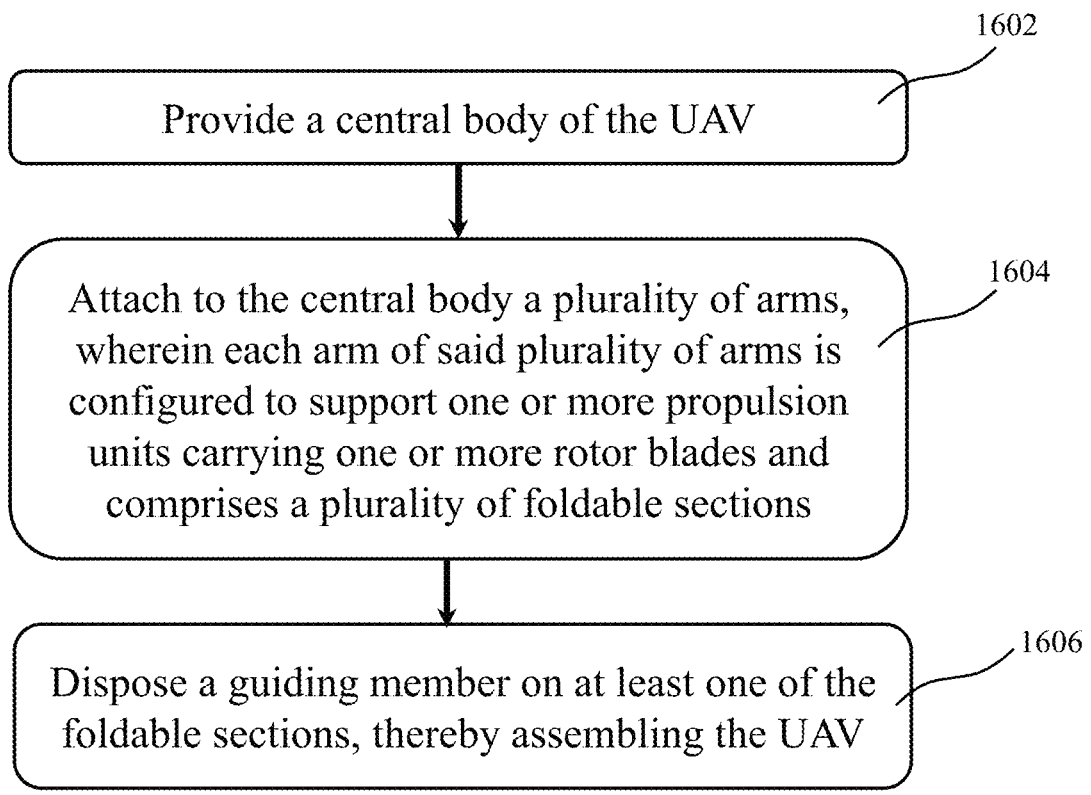
FIG. 16 illustrates a flow chart of a method for assembling a UAV, in accordance with yet another embodiment of the disclosure.

FIG. 16 illustrates a flow chart of a method for assembling a UAV, in accordance with yet another embodiment of the disclosure.

As illustrated in FIG. 16, at 1602, the method may comprise providing a central body of the UAV. The method may also comprise, at 1604, attaching to the central body a plurality of arms, wherein each arm of the plurality of arms may be configured to support one or more propulsion units carrying one or more rotor blades and comprise a plurality of foldable sections. The method may further comprise, at 1606, disposing a guiding member on at least one of the foldable sections, thereby assembling the UAV. The guiding member herein may be configured to guide rotation of the one or more rotor blades as the arm transforms from (1) a flight configuration wherein the plurality of foldable sections are extended from the central body to (2) a compact configuration wherein the plurality of foldable sections are folded substantially parallel to one another, such that the one or more rotor blades are substantially parallel to the plurality of foldable sections when the arm is in the compact configuration.

It should be noted that the methods previously described in FIGS. 13 through 16 are for illustrative purposes, and may incorporate one or more of the embodiments previously described in FIGS. 1 through 12. Additionally, assembly kits corresponding to the respective methods may be provided.

A kit as described herein may be assembled by a user. The kit may be a "do it yourself" (DIY) kit. The kit may comprise a plurality of arms including one or more foldable sections, such as a first foldable section and a second foldable section as discussed before. The kit may further include one or more joints for connecting the first and second foldable sections and connecting the arm to a central body of the UAV. The kit may include instructions for building one or more types of UAVs. The kit may include instructions for the user to assemble the components such that when assembled by the user the UAV has a central body and a plurality of arms that extend from the central body. The user can choose to vary the number of arms. The assembled UAV can also have a plurality of rotors, each rotor attached to the one or more joint portions.

In some embodiments, the kit may comprise instructions for assembling the UAV, such that when the UAV is assembled according to the instructions, the resulting UAV may be characterized as having features as discussed previously. For instance, the resulting UAV may have multiple arms, each of which may have multiple foldable sections that may be folded parallel to one another in the compact configuration. Similarly, the resulting UAV may have one or more actuator mechanisms or chain mechanisms to implement the folding or unfolding of the arm relative to the central body. Further, the resulting UAV may include one or more guiding members for facilitating the stopping of the rotor blades as the arm transforms into the compact configuration.

In some instances, a user may transform the arm or the UAV from the flight configuration (also referred to as an extended state) to the compact configuration (also referred to as a compacted state). For instance, the user may manually move the multiple foldable sections to transform the arm and thus the UAV from the flight configuration to the compact configuration. The user may or may not unlock the arm in the flight configuration or the compact configuration. In some instances, the UAV according to the embodiments of the disclosure may automatically transition between the flight configuration and the compact configuration without any manual intervention by a user. For example, the UAV can be transformed from the flight configuration to the compact configuration in response to an electronic signal that provides a command to effect the transformation. The electronic signal can be transmitted from a system on board or off board the UAV. The transformation may occur without requiring any manual intervention from the user. For instance, one or more actuator mechanism provided on the arms or the central body may respond to the signal and effect the transformation of the UAV. Likewise, the UAV may be transformed from the compact configuration to the flight configuration. In some embodiments, a UAV may be locked into one of the flight configuration and compact configuration. In some instances, multiple UAVs may be deployed at an area for easy management.

When the UAV is in the flight configuration, the UAV may be powered on and/or instructed to fly. In some instances, the UAV is powered on after it is transformed into its flight configuration. For instance, if a user is manually adjusting the arms of the UAV, it may be desirable to keep the UAV powered off to prevent the rotors from turning on while the user is adjusting the arms. In some instances, the UAV may be able to detect if the UAV is not yet locked into the flight configuration and may prevent propulsion units from operating, even if the UAV is powered on, until the UAV is determined to be in the flight configuration.

The propulsion units of the UAV may be prevented from operating while the UAV is in a compact configuration, or as the UAV is being transformed between the flight configuration and the compact configuration. This is a safety feature that can help prevent injury to a user of the UAV. Similarly, it may prevent a user from accidentally turning on the UAV while it is in a compact configuration, which could cause damage to the UAV or injury to bystanders. The UAV may be capable of flying only when the UAV is in the flight configuration. The UAV may be transformed between configurations while the UAV is landed and not in flight. In some instances, the UAV may be powered on before it is transformed into the flight configuration. For instance, if the UAV is automatically transforming in response to a signal, the UAV may be powered on to receive the signal and effect the transformation.

When the UAV is in the flight configuration, the UAV may take-off and fly. Once in the air, the UAV may collect information about its environment. The UAV may communicate with a remote terminal, such as a remote controller operated by a user. The remote terminal may provide signals for the UAV flight, to deliver product, and/or collect information.

Figure 17:
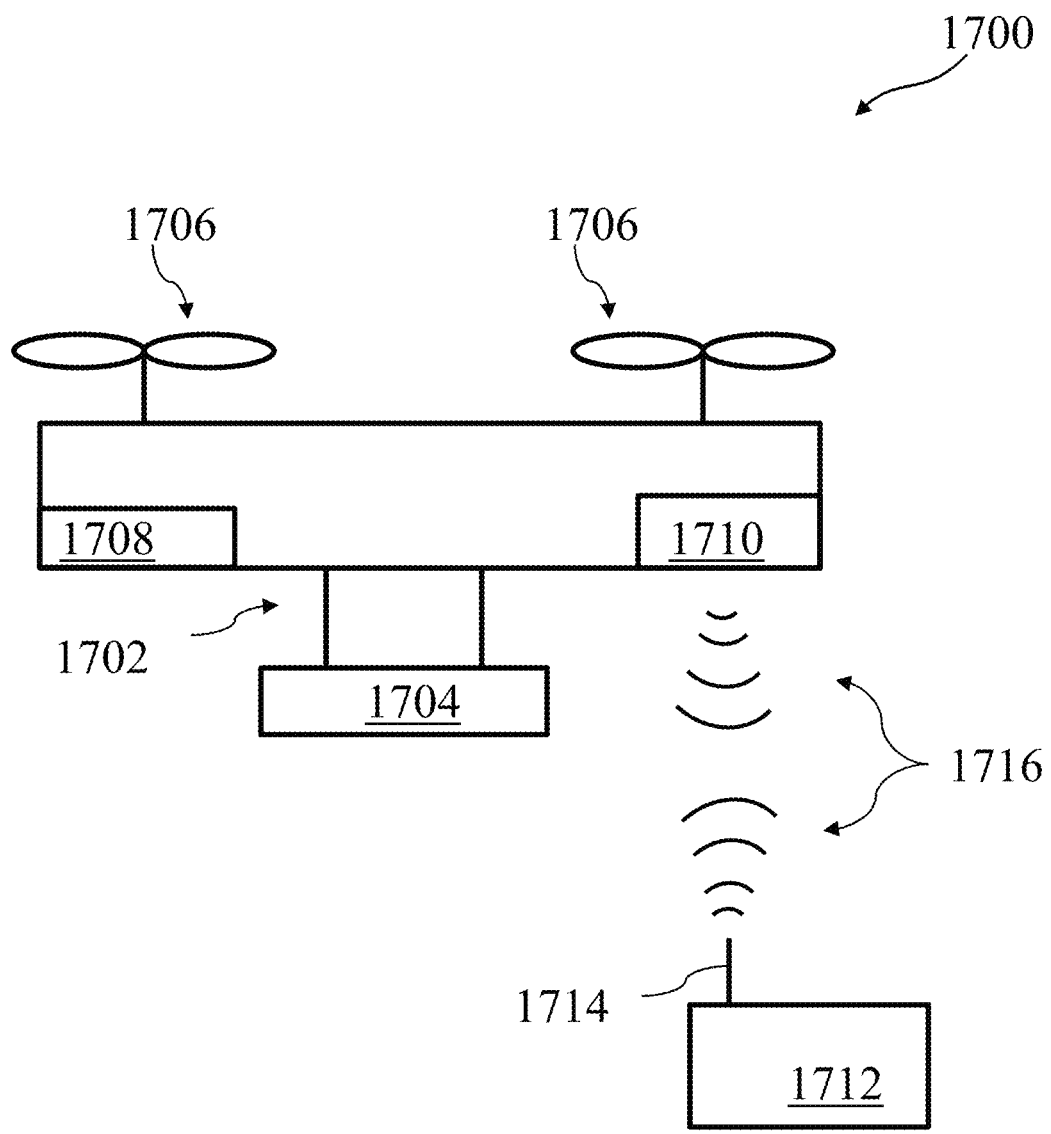
FIG. 17 illustrates a movable object in accordance with embodiments of the disclosure.

FIG. 17 illustrates a movable object 1700 in accordance with embodiments of the disclosure. Although the movable object 1700 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). In some instances, the payload 1704 may be provided on the movable object 1700 without requiring the carrier 1704. The movable object 1700 may include propulsion mechanisms or units 1706, a sensing system 1708, and a communication system 1710.

The propulsion mechanisms 1706 can include one or more of rotors, propellers, blades, engines, motors, wheels, axles, magnets, or nozzles. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1706 can be mounted on the movable object 1700 using any suitable means, such as a support element (e.g., a drive shaft) as described elsewhere herein. The propulsion mechanisms 1706 can be mounted on any suitable portion of the movable object 1700, such on the top, bottom, front, back, sides, or suitable combinations thereof.

In some embodiments, the propulsion mechanisms 1706 can enable the movable object 1700 to take off vertically from a surface or land vertically on a surface without requiring any horizontal movement of the movable object 1700 (e.g., without traveling down a runway). Optionally, the propulsion mechanisms 1706 can be operable to permit the movable object 1700 to hover in the air at a specified position and/or orientation. One or more of the propulsion mechanisms 1706 may be controlled independently of the other propulsion mechanisms. Alternatively, the propulsion mechanisms 1706 can be configured to be controlled simultaneously.

For example, the movable object 1700 can have multiple horizontally oriented rotors that can provide lift and/or thrust to the movable object. The multiple horizontally oriented rotors can be actuated to provide vertical takeoff, vertical landing, and hovering capabilities to the movable object 1700. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1700 (e.g., with respect to up to three degrees of translation and up to three degrees of rotation).

The sensing system 1708 can include one or more sensors that may sense the spatial disposition, velocity, and/or acceleration of the movable object 1700 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1708 can be used to control the spatial disposition, velocity, and/or orientation of the movable object 1700 (e.g., using a suitable processing unit and/or control module, as described below).

Alternatively, the sensing system 1708 can be used to provide data regarding the environment surrounding the movable object, such as weather conditions, proximity to potential obstacles, location of geographical features, location of manmade structures, and the like. In some embodiments, the sensing system herein may be able to provide data about the location of the payload supported by the payload stabilization assembly and connected with the constant force assembly. Therefore, by driving operations of one or more driving units, the payload together with the payload stabilization assembly may return an expected position.

The communication system 1710 enables communication with terminal 1712 having a communication system 1714 via wireless signals 1716. The communication systems 1710 and 1714 may include any number of transmitters, receivers, and/or transceivers suitable for wireless communication. The communication may be one-way communication, such that data can be transmitted in only one direction. For example, one-way communication may involve only the movable object 1700 transmitting data to the terminal 1712, or vice-versa. The data may be transmitted from one or more transmitters of the communication system 1710 to one or more receivers of the communication system 1712, or vice-versa.

Alternatively, the communication may be two-way communication, such that data can be transmitted in both directions between the movable object 1700 and the terminal 1712. The two-way communication can involve transmitting data from one or more transmitters of the communication system 1710 to one or more receivers of the communication system 1714, and vice-versa. In some embodiments, the data regarding the movement of the multiple foldable sections of the arm may also be transmitted by the communication system 1710 to the terminal 1712. Thereby, the terminal user may be able to control the lateral movements of the foldable sections relative to a central body by controlling one or more actuator mechanisms connected to the central body.

In some embodiments, the terminal 1712 can provide control data to one or more of the movable object 1700, carrier 1702, and payload 1704 and receive information from one or more of the movable object 1700, carrier 1702, and payload 1704 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload.

For example, the control data may result in a modification of the location and/or orientation of the movable object (e.g., via control of the propulsion mechanisms 1706), or a movement of the payload with respect to the movable object (e.g., via control of the carrier 1702). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1708 or of the payload 1704). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1712 can be configured to control a state of one or more of the movable object 1700, carrier 17002, or payload 1704. Alternatively or in combination, the carrier 1702 and payload 1704 can also each include a communication module configured to communicate with terminal 1712, such that the terminal can communicate with and control each of the movable object 1700, carrier 1702, and payload 1704 independently.

In some embodiments, the movable object 1700 can be configured to communicate with another remote device in addition to the terminal 1712, or instead of the terminal 1712. The terminal 1712 may also be configured to communicate with another remote device as well as the movable object 1700. For example, the movable object 1700 and/or terminal 1712 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1700, receive data from the movable object 1700, transmit data to the terminal 1712, and/or receive data from the terminal 1712. Optionally, the remote device can be connected to the Internet or other telecommunications network, such that data received from the movable object 1700 and/or terminal 1712 can be uploaded to a website or server.

Figure 18:
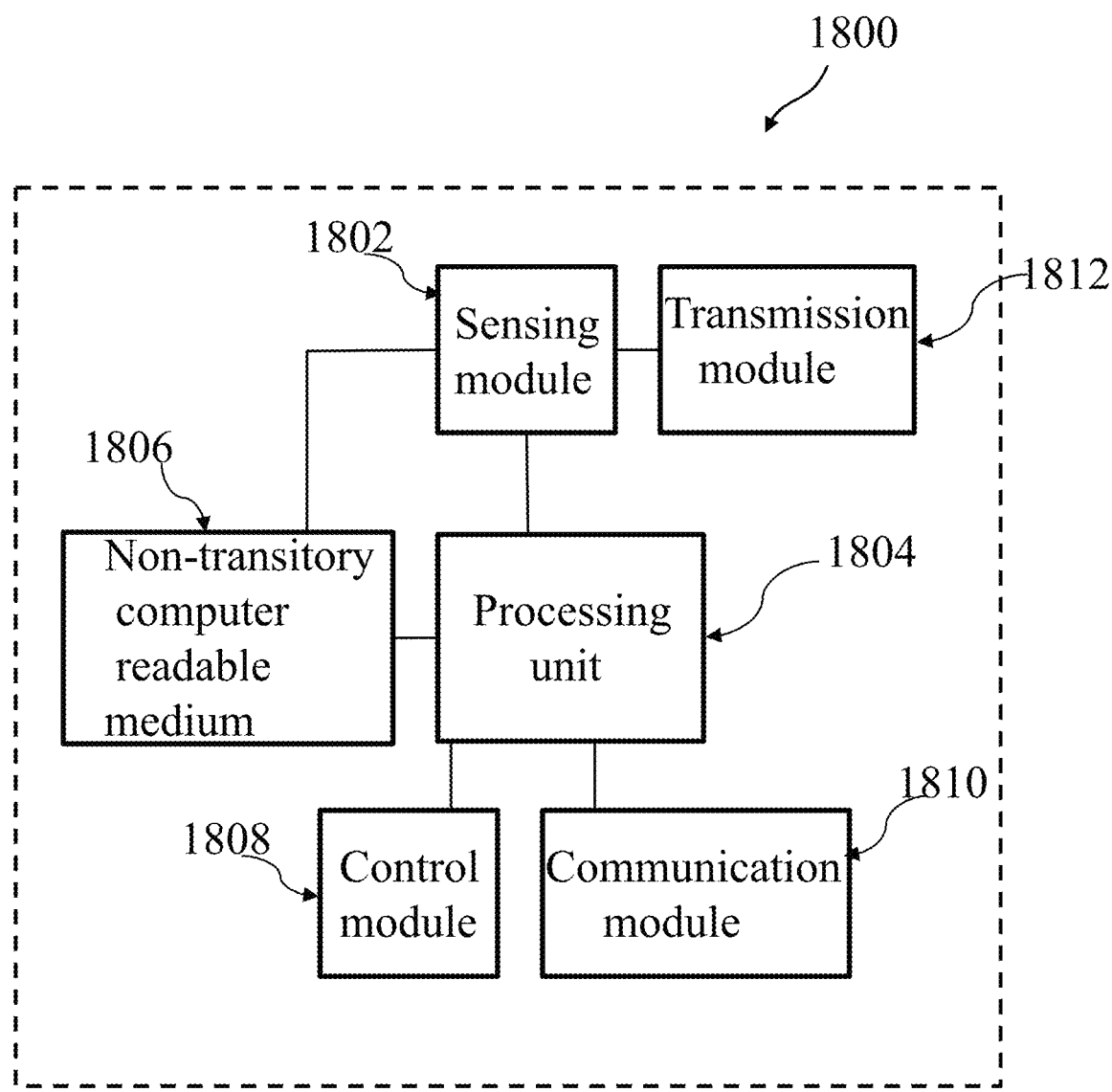
FIG. 18 is a block diagram of a system for controlling a movable object, in accordance with embodiments of the disclosure.

FIG. 18 is a block diagram of a system 1800 for controlling a movable object, in accordance with embodiments. The system 1800 can be used in combination with any suitable embodiment of the systems, devices, and methods disclosed herein. The system 1800 can include a sensing module 1802, processing unit 1804, non-transitory computer readable medium 1806, control module 1808, and communication module 1810.

The sensing module 1802 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1802 can be operatively coupled to a processing unit 1804 having a plurality of processors. In some embodiments, the sensing module can be operatively coupled to a transmission module 1812 (e.g., a Wi-Fi image transmission module) configured to directly transmit sensing data to a suitable external device or system. For example, the transmission module 1812 can be used to transmit images captured by a camera of the sensing module 1802 to a remote terminal. Alternatively, the transmission module can be used to transmit the locations of the arms relative to a central body of a UAV, which may be considered as a specific form of the movable object, to the remote terminal, such that the user may be able to control the folding or unfolding of the arms relative to the central body of the UAV.

The processing unit 1804 can have one or more processors, such as a programmable processor (e.g., a central processing unit (CPU)). The processing unit 1804 can be operatively coupled to a non-transitory computer readable medium 1806. The non-transitory computer readable medium 1806 can store logic, code, and/or program instructions executable by the processing unit 1804 for performing one or more steps. The non-transitory computer readable medium can include one or more memory units (e.g., removable media or external storage such as an SD card or random access memory (RAM)). In some embodiments, data from the sensing module 1802 can be directly conveyed to and stored within the memory units of the non-transitory computer readable medium 1806. The memory units of the non-transitory computer readable medium 1806 can store logic, code and/or program instructions executable by the processing unit 1804 to perform any suitable embodiment of the methods described herein. For example, the processing unit 1804 can be configured to execute instructions causing one or more processors of the processing unit 1804 to analyze sensing data produced by the sensing module. The memory units can store sensing data from the sensing module to be processed by the processing unit 1804. In some embodiments, the memory units of the non-transitory computer readable medium 1806 can be used to store the processing results produced by the processing unit 1804.

In some embodiments, the processing unit 1804 can be operatively coupled to a control module 1808 configured to control a state of the movable object. For example, the control module 1808 can be configured to control the propulsion mechanisms of the movable object to adjust the spatial disposition, velocity, and/or acceleration of the movable object with respect to six degrees of freedom. Alternatively or in combination, the control module 1808 can control one or more of a state of a carrier, payload, or sensing module. According to the embodiments of the disclosure, the control module 1808 may also be capable of controlling the rotation or actuation of the one or more actuation mechanisms such that the folding or unfolding of the multiple foldable sections relative to a central body of a UAV (one embodiment of the movable object) could be controlled having different starting time, stopping time, velocities for the folding or unfolding operation, etc.

The processing unit 1804 can be operatively coupled to a communication module 1810 configured to transmit and/or receive data from one or more external devices (e.g., a terminal, display device, or other remote controller). Any suitable means of communication can be used, such as wired communication or wireless communication. For example, the communication module 1810 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1810 can transmit and/or receive one or more of sensing data from the sensing module 1802, processing results produced by the processing unit 1804, predetermined control data, user commands from a terminal or remote controller, and the like.

The components of the system 1800 can be arranged in any suitable configuration. For example, one or more of the components of the system 1800 can be located on the movable object, carrier, payload, terminal, sensing system, or an additional external device in communication with one or more of the above. Additionally, although FIG. 18 depicts a single processing unit 1804 and a single non-transitory computer readable medium 1806, one of skill in the art would appreciate that this is not intended to be limiting, and that the system 1800 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1800 can occur at one or more of the aforementioned locations.

Any description herein of a carrier may apply to the stabilizing devices as described or any other type of carrier.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An unmanned aerial vehicle (UAV), comprising:
a central body;
a plurality of arms extendable from the central body using one or more actuators, wherein each of the plurality of arms is configured to support one or more propulsion units and comprises at least two foldable sections and at least two connecting mechanisms corresponding to the at least two foldable sections, wherein:
one arm of the plurality of arms is configured to connect to one of the one or more actuators via a linkage mechanism, wherein the one of the one or more actuators is configured to actuate the linkage mechanism between (1) a first dead center position for securing the one arm when the one arm is extended away from the central body in a flight configuration and (2) a second dead center position for securing the one arm when the one arm is folded substantially parallel to the central body in a compact configuration;
for each of the plurality of arms,
the at least two connecting mechanisms comprise a first connecting mechanism and a second connecting mechanism; and
the least two foldable sections comprise a first foldable section and a second foldable section,
wherein:

the first connecting mechanism rotatably connects a proximal end of the respective arm to the central body;

the second connecting mechanism hingedly connects the first foldable section and the second foldable section; and the first foldable section rotates around the first connecting mechanism in a first direction toward a corresponding side of the central body, the second foldable section rotates around the second connecting mechanism in a second direction toward the first foldable section, and the second direction is opposite to the first direction.

2. The UAV of claim 1, wherein the first dead center position is formed when at least two connecting bars of the linkage mechanism are disposed at an angle relative to one another when the one arm is in the flight configuration.

3. The UAV of claim 2, wherein the angle is an obtuse angle.

4. The UAV of claim 1, wherein the second dead center position is formed when at least two connecting bars of the linkage mechanism are disposed at an angle relative to one another when the one arm is in the compact configuration.

5. The UAV of claim 4, wherein the angle is an acute angle.

6. The UAV of claim 1, wherein the one or more actuators comprise one or more motors.

7. The UAV of claim 1, wherein the linkage mechanism comprises at least one of a two-bar linkage mechanism or a four-bar linkage mechanism.

8. The UAV of claim 1, wherein a first end of the linkage mechanism is rotatably connected to the one arm and a second end of the linkage mechanism is rotatably connected to the one of the one or more actuators.

9. The UAV of claim 8, wherein the first end of the linkage mechanism is rotatably connected to the first foldable section.

10. The UAV of claim 8, wherein the one or more actuators are arranged on the central body.

11. The UAV of claim 8, wherein the one of the one or more actuators is configured to drive one or more connecting bars of the linkage mechanism that are connected to the one of the one or more actuators.

12. The UAV of claim 1, wherein the linkage mechanism comprises a first joint for connecting to the one arm and a second joint for connecting to the one of the one or more actuators and wherein a distance between the first joint and the second joint is changed as the linkage mechanism is actuated between the first dead center position and the second dead center position.

13. The UAV of claim 12, wherein the distance between the first joint and the second joint is substantially equal to a length of the linkage mechanism when the linkage mechanism is at the first dead center position.

14. The UAV of claim 12, wherein the distance between the first joint and the second joint is less than a length of any one of connecting bars of the linkage mechanism at the second dead center position.

15. The UAV of claim 1, wherein the at least two foldable sections are extended away from the central body when the linkage mechanism is in the first dead center position.

16. The UAV of claim 1, wherein the at least two foldable sections are folded substantially parallel to one another when the linkage mechanism is in the second dead center position.

17. The UAV of claim 1, wherein the first foldable section is configured to connect to the linkage mechanism and the second foldable section is configured to support the one or more propulsion units.

18. The UAV of claim 17, wherein the first foldable section and the second foldable sections are configured to rotate relative to one another using an actuation mechanism.

19. The UAV of claim 18, wherein the actuation mechanism comprises at least one of a cable, a chain, a belt, or a spring.

* * * * *